(12) United States Patent
Iihoshi et al.

(10) Patent No.: US 10,412,001 B2
(45) Date of Patent: Sep. 10, 2019

(54) COMMUNICATION TERMINAL, COMMUNICATION METHOD, AND PROGRAM

(75) Inventors: Takahiro Iihoshi, Tokyo (JP); Shuichi Karino, Tokyo (JP); Akira Tsuji, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/346,952

(22) PCT Filed: Sep. 6, 2012

(86) PCT No.: PCT/JP2012/073387
§ 371 (c)(1),
(2), (4) Date: Mar. 24, 2014

(87) PCT Pub. No.: WO2013/042598
PCT Pub. Date: Mar. 28, 2013

(65) Prior Publication Data
US 2014/0241365 A1    Aug. 28, 2014

(30) Foreign Application Priority Data
Sep. 22, 2011 (JP) ................. 2011-207659

(51) Int. Cl.
*H04L 12/721* (2013.01)
*H04L 12/717* (2013.01)
*H04W 24/08* (2009.01)

(52) U.S. Cl.
CPC .......... *H04L 45/72* (2013.01); *H04L 45/38* (2013.01); *H04L 45/42* (2013.01); *H04W 24/08* (2013.01)

(58) Field of Classification Search
None
See application file for complete search history.

(56) References Cited

U.S. PATENT DOCUMENTS

| 6,041,049 A * | 3/2000 | Brady ............ H04L 45/02 370/351 |
| 6,385,198 B1 * | 5/2002 | Ofek ............ H04L 12/5695 370/389 |

(Continued)

FOREIGN PATENT DOCUMENTS

| CA | 2786429 A1 | 7/2011 |
| JP | 2006-135971 | 5/2006 |

(Continued)

OTHER PUBLICATIONS

Extended European Search Report issued by the European Patent Office for European Patent Application No. 12833728.4 dated Feb. 6, 2015 (6 pgs.).

(Continued)

*Primary Examiner* — Jeffrey M Rutkowski
*Assistant Examiner* — Andre Tacdiran
(74) *Attorney, Agent, or Firm* — Wilmer Cutler Pickering Hale and Dorr LLP

(57) ABSTRACT

The communication terminal of the present invention, which is controlled by a control device, includes a first storage means for associating information identifying a packet with processing of the packet and storing it as an entry, a searching means for searching processing corresponding to a received packet from the first storage means, and an inquiry means for determining the control device of which is inquired, based on the entry corresponding to the received packet, the entry being stored in the first storage means, if the searched processing is the inquiry to the control device, and for performing the inquiry addressed to the determined control device.

49 Claims, 20 Drawing Sheets

(56) References Cited

U.S. PATENT DOCUMENTS

| | | | |
|---|---|---|---|
| 7,102,996 B1 | 9/2006 | Amdahl et al. | |
| 7,395,349 B1* | 7/2008 | Szabo | H04L 12/4641 709/238 |
| 7,587,624 B1* | 9/2009 | Weber | H04L 41/0654 370/250 |
| 2002/0099842 A1* | 7/2002 | Jennings | H04L 12/5695 709/231 |
| 2005/0005019 A1* | 1/2005 | Harville | H04L 29/06 709/231 |
| 2005/0149754 A1* | 7/2005 | Rasanen | H04L 29/12066 726/4 |
| 2009/0222548 A1* | 9/2009 | Dommety | H04L 29/12028 709/223 |
| 2011/0273988 A1* | 11/2011 | Tourrilhes | H04L 41/0816 370/237 |
| 2011/0317559 A1* | 12/2011 | Kern | H04L 41/0816 370/235 |
| 2012/0250496 A1* | 10/2012 | Kato | H04L 47/125 370/216 |
| 2012/0263186 A1 | 10/2012 | Ueno et al. | |
| 2013/0046882 A1 | 2/2013 | Takashima et al. | |
| 2013/0058208 A1* | 3/2013 | Pfaff | H04L 12/4633 370/217 |
| 2013/0058354 A1* | 3/2013 | Casado | H04L 12/4633 370/401 |
| 2013/0114615 A1* | 5/2013 | Suemitsu | H04L 47/2441 370/401 |

FOREIGN PATENT DOCUMENTS

| | | | | |
|---|---|---|---|---|
| JP | 2006-135975 | | 5/2006 | |
| JP | 2011-82834 | | 4/2011 | |
| JP | 2011-101245 | | 5/2011 | |
| JP | WO 2011065268 A1 * | | 6/2011 | H04L 47/125 |
| WO | WO-2011/037105 A1 | | 3/2011 | |
| WO | WO-2011/065268 | | 6/2011 | |

OTHER PUBLICATIONS

Casado, Martin et al., Ethane: Taking Control of the Enterprise, SIGCOMM'07, Aug. 27-31, 2007, Kyoto, Japan. 12 pages.

McKeown, Nick, et al. OpenFlow: Enabling Innovation in Campus Networks dated Mar. 14, 2008; (Jun. 28, 2011) internet <URL http:www.openflowswitch.org/documents/openflow-wp-latest.pdf> 6 pages.

Sherwood, Rob, et al., FlowVisor: A Network Virtualization Layer; http://OpenFlowSwitch.org/downloads/technicalreports/openflow-tr-2009-1-flowvisor; Oct. 14, 2009, 15 pages.

OpenFLow Switch Specification Version 1.0.0 (Wire Protocol 0x01) Dec. 31, 2009 [Aug. 31, 2011 search] Internet <URL: http:www.openflowswitch.org/documents/openflow-spec-v.1.0.0.pdf>; 42 pages.

International Search Report Corresponding to PCT/JP2012/073387, dated Oct. 9, 2012, 3 pages.

Written Opinion corresponding to PCT/JP2012/073387, dated Oct. 9, 2012, 3 pages.

European Office Action issued by the European Patent Office for European Application No. 12833728.4 dated Sep. 6, 2018 (6 pages).

Kontesidou, G. and Zarifis, K., "Openflow Virtual Networking: A Flow-Based Network Virtualization Architecture," Master of Science Thesis, Stockholm, Sweden, TRITA-ICT-EX-2009:205, Royal Institute of Technology, 80 pages (Nov. 2009).

Communication Under Rule 71(3) EPC issued in European Patent Application No. 12833728.4, dated Jun. 18, 2019, 99 pages.

\* cited by examiner

FIG.6

FLOW TABLE 125

| PRIORITY | MATCHING RULE | ACTION |
|---|---|---|
| a | FLOW A | CONTROLLER : A |
| ... | ... | ... |
| a − k | FLOW B | OUTPUT |
| ... | ... | ... |
| a − n | FLOW C | CONTROLLER : B |
| ... | ... | ... |
| a − m | FLOW D | CONTROLLER : C |

FIG.9

| FLOW TABLE | | | | ENTRY ADDITION INFORMATION | |
|---|---|---|---|---|---|
| PRIORITY | MATCHING RULE | ACTION | | PERMISSION | OWNER |
| a | FLOW A | CONTROLLER : A | | A: READ-WRITE, B: READ-ONLY | A |
| ⋮ | ⋮ | ⋮ | | ⋮ | ⋮ |
| a−k | FLOW B | OUTPUT | | A: READ-WRITE, B: READ-WRITE | B |
| ⋮ | ⋮ | ⋮ | | ⋮ | ⋮ |
| a−n | FLOW C | CONTROLLER : B | | A: READ-WRITE, B: READ-ONLY | A |
| ⋮ | ⋮ | ⋮ | | ⋮ | ⋮ |
| a−m | FLOW D | CONTROLLER : A | | A: READ-WRITE | A |

FIG.15

FLOW TABLE 225

| PRIORITY | MATCHING RULE | ACTION | CONTROLLER | Owner |
|---|---|---|---|---|
| a | FLOW A | CONTROLLER : A | A: READ-WRITE, B: READ-ONLY | A |
| ⋮ | ⋮ | ⋮ | ⋮ | ⋮ |
| a-k | FLOW B | OUTPUT | A: READ-WRITE, B: READ-WRITE | B |
| ⋮ | ⋮ | ⋮ | ⋮ | ⋮ |
| a-n | FLOW C | CONTROLLER : B | A: READ-WRITE, B: READ-ONLY | A |
| ⋮ | ⋮ | ⋮ | ⋮ | ⋮ |
| a-m | FLOW D | CONTROLLER : A | A: READ-WRITE | A |

FIG.18

CONTROLLER FLOW TABLE 3213

| PRIORITY | MATCHING RULE | DESTINATION CONTROLLER |
|---|---|---|
| a | FLOW A | A |
| a − n | FLOW B | B |
| a − m | FLOW C | A |

COMMUNICATION TERMINAL, COMMUNICATION METHOD, AND PROGRAM

CROSS-REFERENCE TO RELATED APPLICATIONS

This application is a national stage application of International Application No. PCT/JP2012/073387, entitled "COMMUNICATION TERMINAL, COMMUNICATION METHOD, AND PROGRAM", filed on Sep. 6, 2012, which claims the benefit of the priority of Japanese Patent Application No. 2011-207659, filed Sep. 22, 2011, the disclosures of each of which are hereby incorporated by reference in their entirety.

TECHNICAL FIELD

The invention relates to a communication terminal, communication method, and a program which connects with a network.

BACKGROUND ART

In recent years, an OpenFlow technology has been disclosed. Non Patent Document 1, Non Patent Document 2, Patent Document 1, and Patent Document 2 describe the OpenFlow. In the OpenFlow, a communication method between an OpenFlow Switch (hereinafter referred to as OFS) function and an OpenFlow Controller (hereinafter referred to as OFC), which is a control device thereof, is defined. The OFS and the OFC are connected with each other through a control path which is called a secure channel. The OFS is controlled by a single OFC.

The OFS includes a flow table therein. In the flow table, at least a set of a header field for identifying a packet flow and processing of the packet is registered as an entry. The header field for identifying a packet flow is called a matching rule. The header field is composed of a plurality of tuples, each of which can designate a wildcard. If the wild card is designated, a range of the flow can be represented as a group. For example, suppose that a transmission source IP (Internet Protocol) address of a header field of a certain entry is designated, and the other tuples are set to wildcards. At the time, the set entry represents a group of all flows transmitted from the designated IP address. All packets transmitted from the designated IP address corresponds to the set entry regardless of the address.

The processing of the packet is called an action. The action includes at least transfer to the designated port, transfer to the OFC, turnover transfer to an input port, abandonment, and the like. The transfer to the designated port is used for packet transfer to the next switch. The transfer to the OFC is mainly used for inquiry of a processing method of the packet.

Receiving the packet, the OFS searches the flow table. If an entry which matches the received packet exists, packet processing is performed in accordance with the action of the matched entry. Priority can be set in the entry. If the packet matches a plurality of entries, the action of the entry with the highest priority is employed.

If no entry which matches the received packet exists in the flow table, the OFS inquires of the OFC how to perform processing of the received packet. At this time, the OFS transfers a part of or all of the packets to the OFC through secure channel. The OFC receiving the inquiry about the processing adds the entry to the flow table, if necessary, and informs the OFS of the processing method.

Patent Document 3 and Patent Document 4 disclose the network architecture having a control device with a control function and a switch with a transfer function which is controlled by the control device.

RELATED ART DOCUMENT

Patent Document

[Patent Document 1] Tokukai 2011-082834 A
[Patent Document 2] Tokukai 2011-101245 A
[Patent Document 3] Tokukai 2006-135971 A
[Patent Document 4] Tokukai 2006-135975 A Non Patent Document

[Non Patent Document] Nick McKeown et. al OpenFlow: Enabling Innovation in Campus Networks, [Jun. 28, 2011]
[Non Patent Document 2] OpenFlow Switch Specification Version 1.0.0 (Wire Protocol 0x01) Dec. 31, 2009, [Aug. 31, 2011 search]

SUMMARY OF INVENTION

Technical Problem

The OpenFlow disclosed in Non Patent Document 1, Non Patent Document 2, Patent Document 1, and Patent Document 2, and the architecture disclosed in Patent Document 3 and Patent Document 4 are network systems which are based on the premise that a switch operation is finely controlled by a single controller.

In the Documents above, when a plurality of controllers are arranged, it is impossible to control the switch by the plurality of controllers.

An object of the invention is to provide a communication terminal, a communication method, and a program, which can solve the problem described above.

Solution to Problem

A communication terminal of the invention is a communication terminal controlled by a control device, and includes a first storage means for associating information identifying a packet with processing of the packet and storing it as an entry a searching means for searching processing corresponding to a received packet from the first storage means and an inquiry means for determining the control device of which is inquired, based on the entry corresponding to the received packet, the entry being stored in the first storage means, if the searched processing is the inquiry to the control device, and for performing the inquiry addressed to the determined control device.

A communication method of the invention includes the step of searching processing corresponding to a received packet from a first storage means for associating information identifying a packet with processing of the packet and storing it as an entry, determining the control device of which is inquired, based on the entry corresponding to the received packet, the entry being stored in the first storage means, if the searched processing is the inquiry to the control device controlling a communication terminal, and performing the inquiry addressed to the determined control device.

A program of the invention causes a computer to execute process comprising searching processing corresponding to a received packet from a first storage means for associating information identifying a packet with processing of the packet and storing it as an entry, determining the control device of which is inquired, based on the entry corresponding to the received packet, the entry being stored in the first storage means, if the searched processing is the processing to be inquired of the control device controlling a communication terminal; and performing the inquiry addressed to the determined control device.

Advantageous Effects of Invention

According to the invention, even though a plurality of controllers or control devices controlling a switch or a communication terminal are arranged, the plurality of controllers or the plurality of control devices can control the switch or the communication terminal.

BRIEF DESCRIPTION OF DRAWINGS

FIG. 6 is a diagram illustrating a configuration example of a flow table of a second exemplary embodiment.

FIG. 9 is a diagram illustrating an example of an entry addition information of a second exemplary embodiment.

FIG. 15 is a diagram illustrating a configuration example of a flow table of a third exemplary embodiment.

FIG. 18 is a diagram illustrating a configuration example of a controller flow table of a fourth exemplary embodiment.

DESCRIPTION OF EMBODIMENTS

Exemplary embodiments of the present invention is described in detail with reference to the drawings.

First Exemplary Embodiment

Configuration

Figure 1:
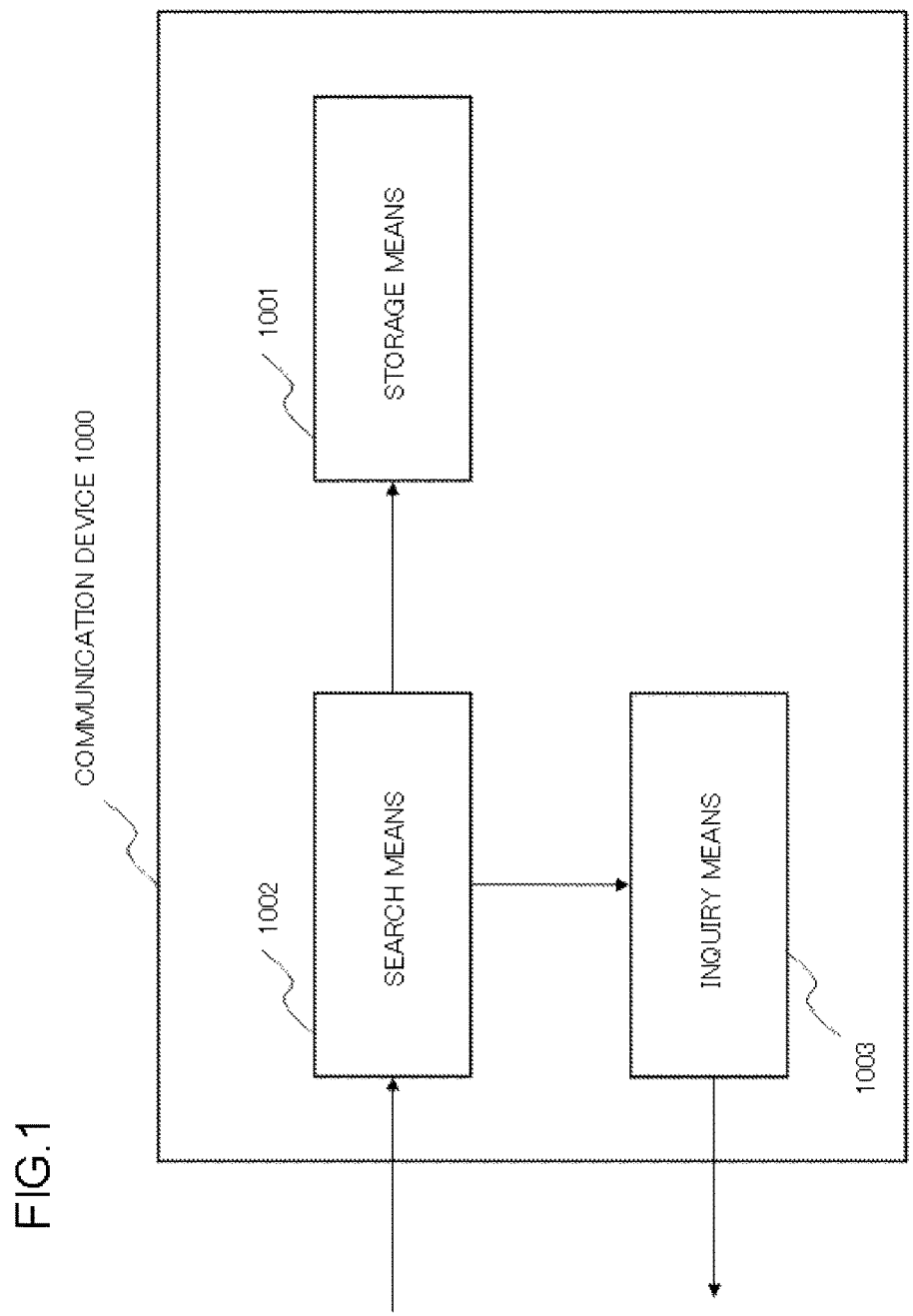
FIG. 1 is a diagram illustrating a configuration example of a communication device of a first exemplary embodiment.

FIG. 1 illustrates a configuration example of a communication device 1000 of a first exemplary embodiment of the invention. In FIG. 1, the communication device 1000 includes a storage means 1001, a searching means 1002, and an inquiry means 1003. The communication device 1000 connects with a control device, which is not illustrated. The communication device 1000 is controlled by the control device.

The storage means 1001 associates information for identifying a packet with processing of the packet and stores it therein.

When receiving the packet, the searching means 1002 searches the processing corresponding to the received packet in the storage means 1001.

If the processing searched by the searching means 1002 is an inquiry to the control device, the inquiry means 1003 performs the following operations. The inquiry means 1003 initially determines the control device to be inquired on the basis of an entry of the storage means 1001 corresponding to the received packet. Next, the inquiry means 1003 performs the inquiry addressed to the determined control device.

[Operation]

Figure 2:
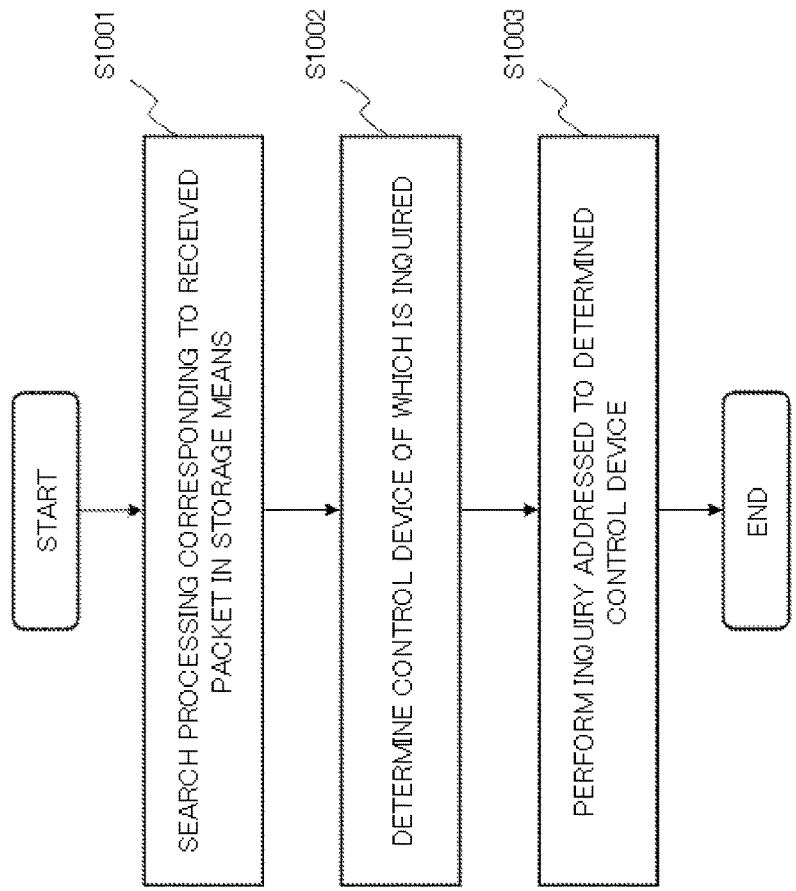
FIG. 2 is a flow chart illustrating an operation example of a first exemplary embodiment.

Operations of the first exemplary embodiment are described below using a flow chart in FIG. 2.

The searching means 1002 searches the processing corresponding to the received packet in the storage means 1001 (S1001).

If the processing searched by the searching means 1002 is the inquiry to the control device, the inquiry means 1003 determines the control device to be inquired on the basis of the entry of the storage means 1001 (S1002).

Next, the inquiry means 1003 performs the inquiry addressed to the control device determined in S1002 (S1003).

As described above, in the first exemplary embodiment, the communication device 1000 includes the storage means 1001, the searching means 1002, and the inquiry means 1003. However, each of these means may be included not only in the communication device, but a communication terminal or other communication apparatus.

[Advantageous Effects]

As described above, according to the first exemplary embodiment, the communication device determines the control device which is a processing inquiry destination of the received packet and inquires thereof. As a result, the control device which receives the inquiry can determine the processing of the received packet. Therefore, according to the first exemplary embodiment, since one control device to control the received packet can be determined even though a plurality of control devices to control the communication device are arranged, the communication device can be controlled by the plurality of control devices.

Second Exemplary Embodiment

Configuration

Figure 3:
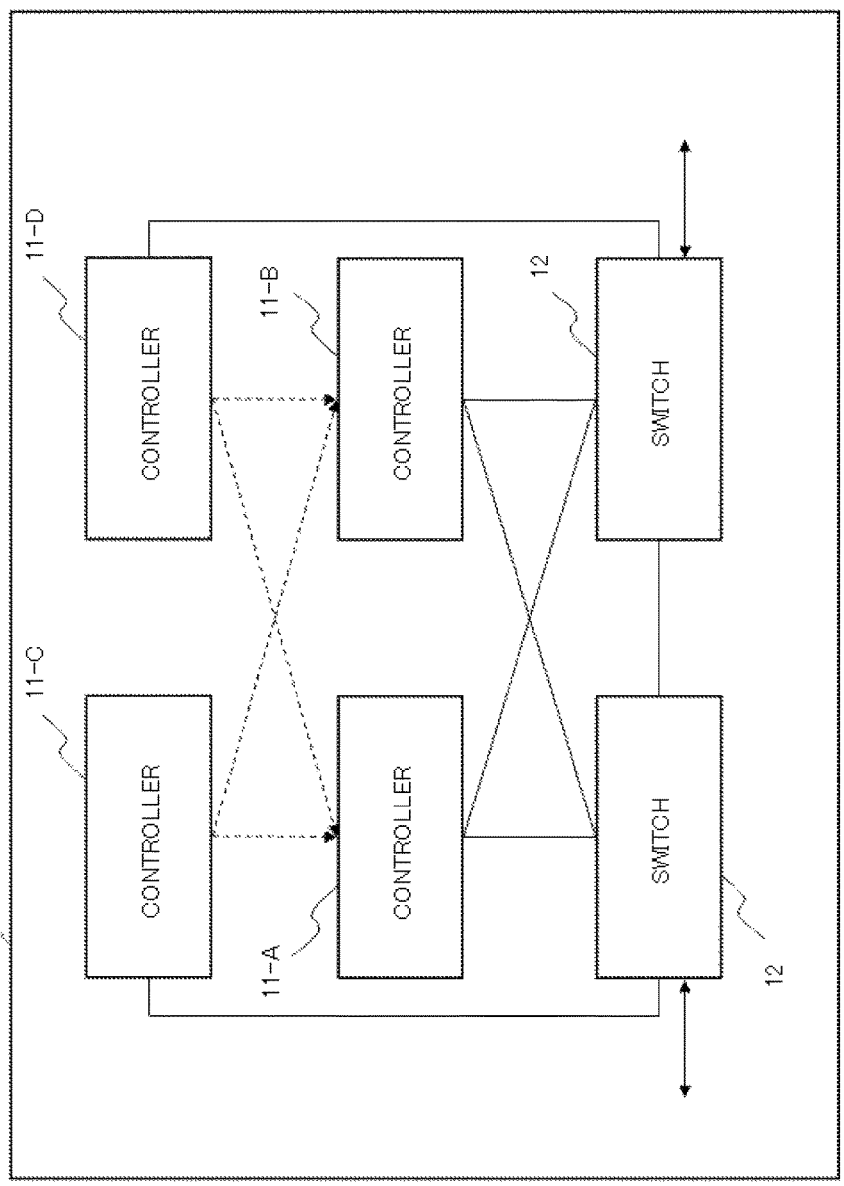
FIG. 3 is a diagram illustrating a configuration example of a communication system of a second exemplary embodiment.

FIG. 3 is a diagram illustrating a configuration example of a communication system of a second exemplary embodiment. A communication system 1 includes a plurality of controllers 11 connected with a network, which is not illustrated, and a plurality of switches 12. In an example of FIG. 3, a controller 11-A, a controller 11-B, a controller 11-C, and a controller 11-D are arranged as the controller 11. Hereinafter, the four controllers are described as the controller 11 if it is not necessary to be distinguished.

The switch 12 is connected with the plurality of controllers 11 through a control path. The controller 11 connects with the switch 12 to be controlled by the controller 11 and transmits/receives a control message to/from the switch 12.

In the example of FIG. 3, two switches 12 are arranged and one switch connects with the controller 11-A, and the other switch connects with the controller 11-B. In two sections, a section from the controller 11-C to the controller 11-A, and a section from the controller 11-D to the controller 11-B, dashed lines with arrows are depicted to show connection relations. This means that a controller may restrict a communication range controlled by the other controller.

Figure 4:
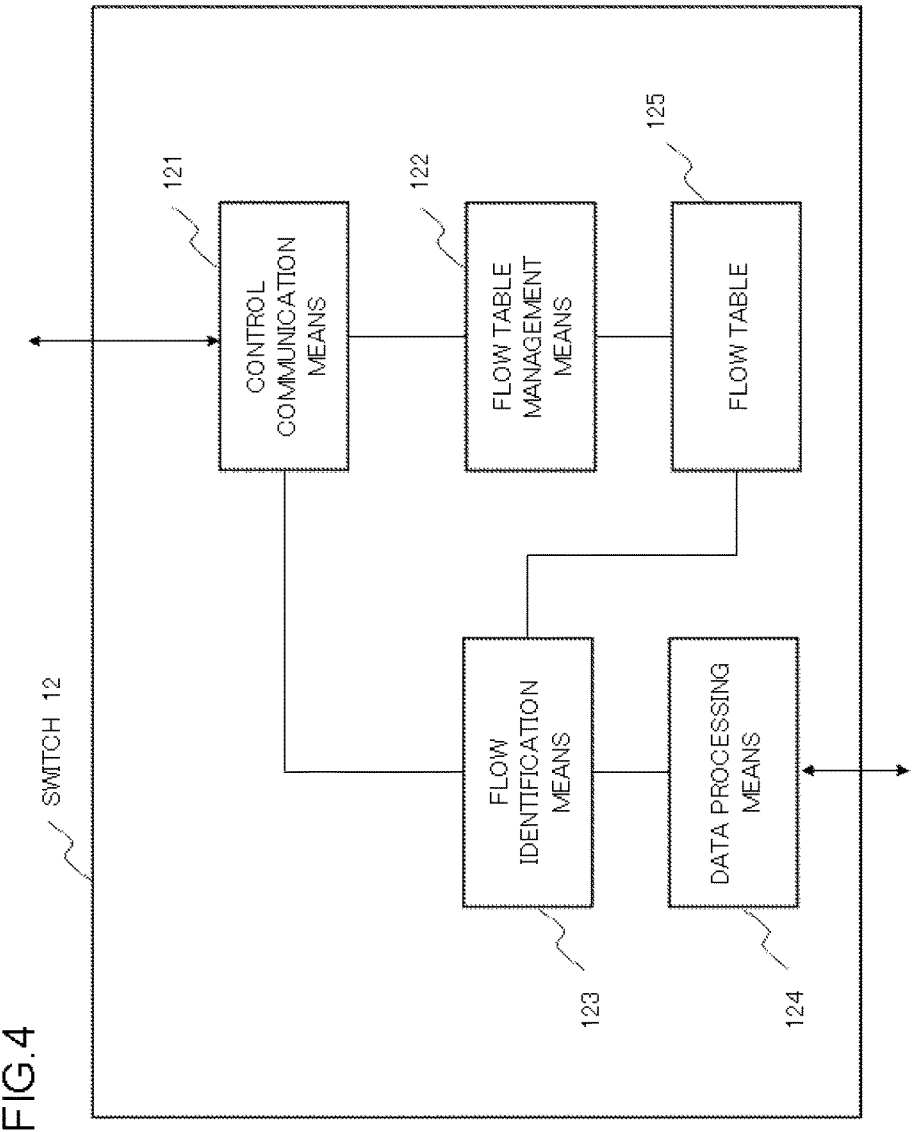
FIG. 4 is a diagram illustrating a configuration example of a switch of a second exemplary embodiment.

FIG. 4 illustrates a configuration example of the switch 12. According to FIG. 4, the switch 12 includes control communication means 121, flow table management means 122, flow identification means 123, data processing means 124, and a flow table 125.

The control communication means 121 connects with the controller 11, the flow table management means 122, and the flow identification means 123. When receiving the control message from the controller 11, the control communication means 121 sends a control instruction to the flow table management means 122. When the flow table management means 122 feeds back a control result, the control communication means 121 sends the control message to the controller 11, when necessary.

Figure 5:
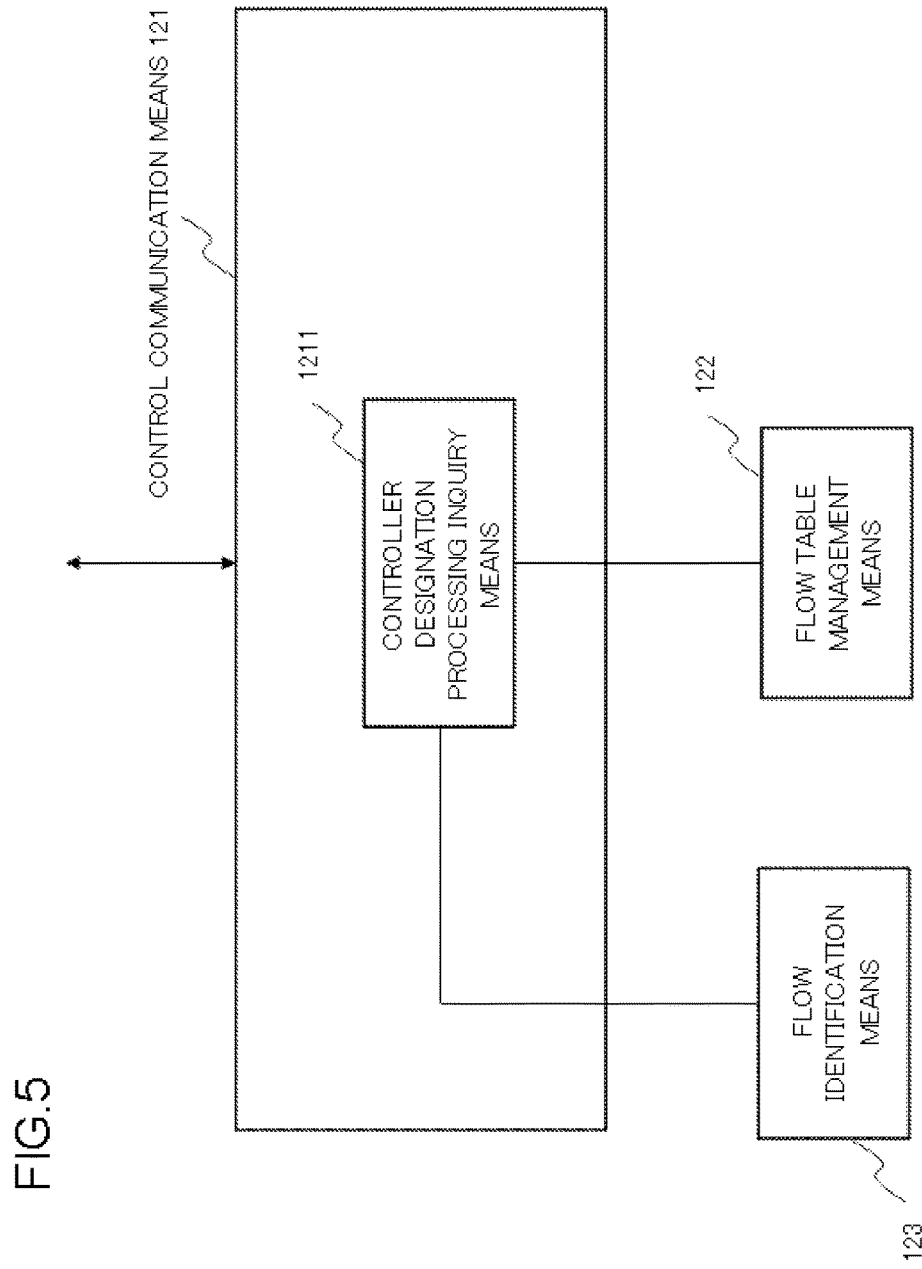
FIG. 5 is a diagram illustrating a configuration example of a switch of a second exemplary embodiment.

FIG. 5 is a diagram illustrating a configuration example of the control communication means 121. According to FIG. 5, the control communication means 121 includes controller designation processing inquiry means 1211.

The controller designation processing inquiry means 1211 receives an inquiry as to contents of processing of a packet and designation of the controller, and inquires of the controller the processing.

The flow table management means 122 manages information described in the flow table. The flow table management means 122 is described below in detail.

The flow identification means 123 identifies a flow including the packet which reaches the data processing means 124. The flow identification means 123 connects with the flow table 125. The flow identification means 123 searches the processing of the identified flow in the flow table 125.

The flow table 125 stores contents of flow processing. A configuration of the flow table 125 is illustrated in FIG. 6, as an example. Entries of the flow table 125 include at least priority, a matching rule, and an action. The priority, a, k, n, and m are natural numbers. The magnitude relation thereof is k<n<m<a. Therefore, in the example of FIG. 6, the entries are arranged in descending order of priority. The matching rule stores tuples, like an IP address, and a MAC (Media Access Control) address, as described in the background art. A way how to process a packet suitable to the matching rule is described in the action.

In the second exemplary embodiment, an action to inquire as to processing by designating the controller may be registered to a packet suitable to the matching rule. For example, with respect to a packet belonging to the flow A, an inquiry as to processing to the controller A is performed, and with respect to a packet belonging to the flow C, an inquiry as to processing to the controller B is performed. Thereby, for example, since an inquiry as to processing to the controller A is performed when the switch 12 receives a packet belonging to the flow A, the controller A obtains the operation authority for the flow A. The processing described in the background art may be registered as the action. For example, with respect to a packet belonging to the flow B, processing of transferring to the designated port is performed.

The data processing means 124 receives a packet from other switch connected with the switch 12. When receiving the packet, the data processing means 124 transmits a part of the packet, the whole packet, or a copy of the packet to the flow identification means 123. The flow identification means 123 performs matching with the entry of the flow table 125 to identify the flow, and outputs the action. The data processing means 124 receives the action and performs packet processing.

A method of setting the operation authority in the entry of the flow table 125 in the switch 12 by the controller 11 is described below. The controller 11 describes operation authority information as addition information of the control message for instructing the switch 12 to operate the entry of the flow table 125. Besides the control message, the controller 11 may transmit a special message designating the operation authority to the switch 12.

Figure 7:
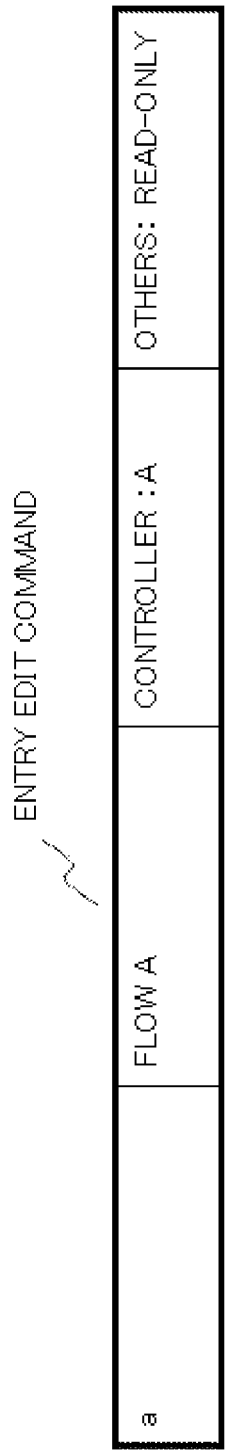
FIG. 7 is a diagram illustrating an example of an entry edit command of a second exemplary embodiment.

FIG. 7 illustrates an example of an entry edit command transmitted from the controller 11 to the switch 12. The entry of FIG. 7 defines inquiring of the controller A processing as an action with respect to the packet with the priority of a and the matching rule of the flow A. The controller 11 transmits the entry of FIG. 7 to the switch 12 and sets the entry of FIG. 7 in the flow table 125 of the switch 12.

The item "Others:ReadOnly" shows the operation authority of the entry of FIG. 7. The target of the operation authority may be discretely designated by the controller A, the controller B, or the like, or may be designated by a group of the controllers. By a macro using the relation between the controller designating the authority and the other controller, it may be designated. In the example of FIG. 7, it is designated that a controller other than the controller designating the authority is allowed to only read. The entry edit command in FIG. 7 gives the controller A the authority thereof. "Others:ReadOnly" shows that a controller other than the controller A is allowed to only read.

Figure 8:
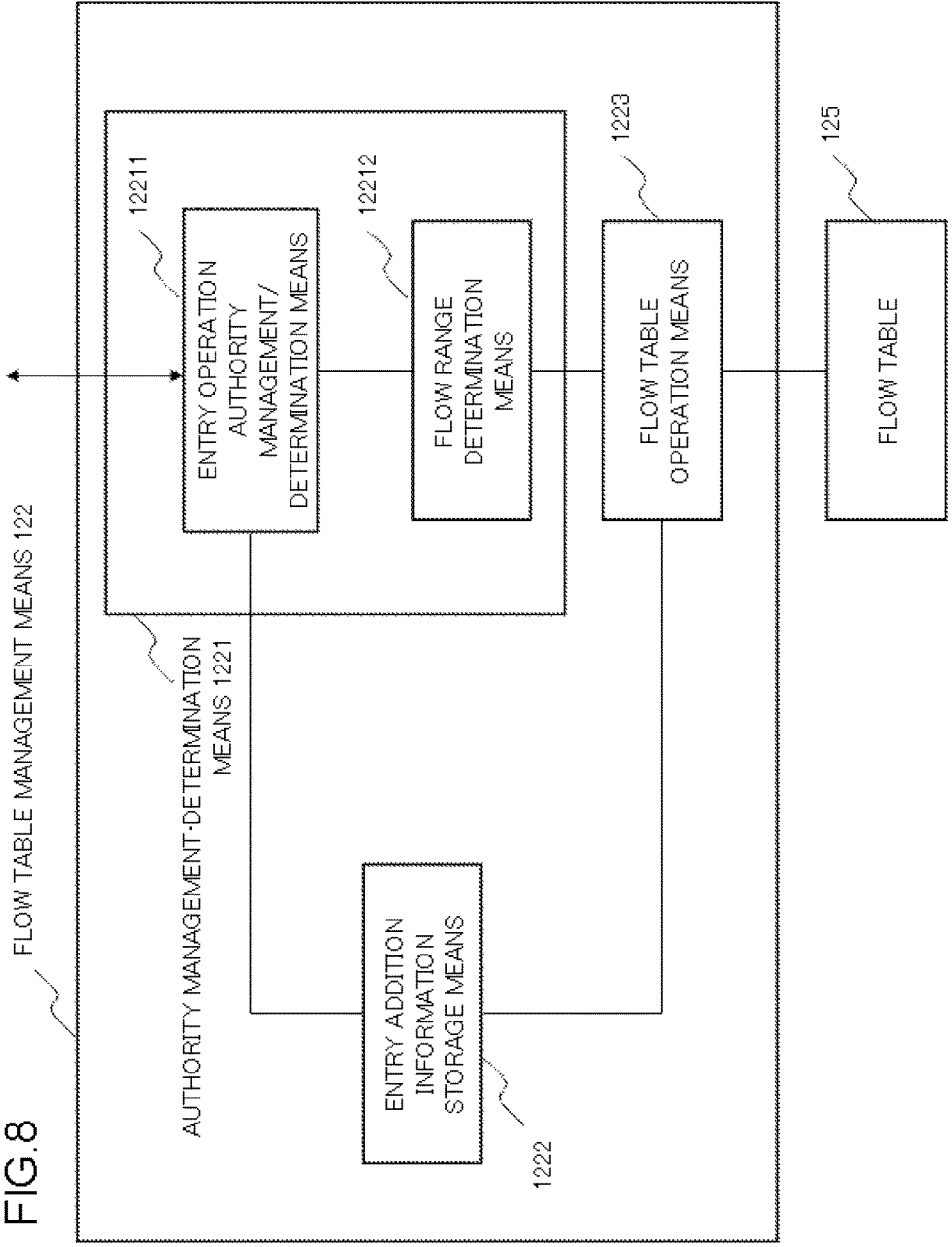
FIG. 8 is a diagram illustrating a configuration example of a switch of a second exemplary embodiment.

Next, the flow table management means 122 is described. As illustrated in FIG. 8, the flow table management means 122 includes authority management/determination means 1221, entry addition information storage means 1222, and flow table operation means 1223.

The authority management/determination means 1221 includes entry operation authority management/determination means 12211 and flow range determination means 12212. The entry operation authority management/determination means 12211 connects with the control communication means 121, the entry operation authority management/determination means 12211, the entry addition information storage means 1222 and the flow table operation means 1223. The flow range determination means 12212 connects with the flow table operation means 1223. The entry addition information storage means 1222 connects with the flow table operation means 1223. The flow table operation means 1223 connects with the flow table 125.

The authority management/determination means 1221 determines the authority in response to a request for the operation of the entry from the controller 11 as shown in FIG. 7, and performs processing according to the determination result.

The entry addition information storage means 1222 stores authority information corresponding to the entry of the flow table 125. The authority information includes permission which is uniquely decided for each controller, and owner information.

The entry operation authority management/determination means 12211 manages the operation authority of the entry and determines whether or not to operate in response to the request for the operation of the entry from the controller 11. When the operation authority is set from entry operation authority instruction means 112 to the entry of the flow table 125 through the control communication means 121, the entry operation authority management/determination means 12211 stores information of the operation authority in the entry addition information storage means 1222. When the controller 11 refers to and edits the entry through the control communication means 121, the entry operation authority management/determination means 12211 refers to the operation authority information of the entry addition information storage means 1222. Furthermore, the entry operation authority management/determination means 12211 inquires of the flow range determination means 12212 if the edit of the entry includes change of the matching rule, and determines whether or not to allow the operation in view of the returned determination result.

When the controller 11 registers the entry, the flow range determination means 12212 determines whether or not to perform the control by the controller 11. Specifically, it is determined whether or not the range in which the controller 11 requests the control falls within the flow range in which the control is allowed. The flow range to be allowed may be, for example, a union of the matching rules of the entry with the action for inquiring of the controller. The invalidated flow range may be the matching rule, having the action for inquiring of the other controller, which has higher priority than that of the entry which is grounds for the allowed range.

FIG. 9 illustrates an example of the entry addition information stored corresponding to the entry of the flow table 125 and the entry addition information storage means 1222. An example of determination which is performed in the flow range determination means 12212 is explained using FIG. 9. In the flow table, the first column shows priority, the second column shows the matching rules, and the third column shows the actions. In the entry addition information, the first column shows operation authorities of the corresponding entry in the flow table 125, and the second column shows owners of the corresponding entry. In the example in FIG. 9, the entries are arranged in descending order of priority, like FIG. 6. In the example in FIG. 9, the controller A limits the range of the flow where the controller B controls. "Controller: A" in the column of the actions means that when receiving a packet which matches the flow A, the switch 12 inquires of the controller A about processing. In this case, there are two conditions that the controller B can register the entry with the matching rule which is the flow B. One of the conditions is that the range of the flow shown by the flow B is included in the range of the flow shown by the flow C which is the matching rule of the entry of the controller A having the action for inquiring of the controller B. The other is that the magnitude relationship of priority of the entry is a−n<a−k<a.

[Operation]

FIGS. 10 to 13 are flowcharts illustrating an operation of the communication system 1 of the second exemplary embodiment. The operation of the second exemplary embodiment is described using the flowcharts.

Figure 10:
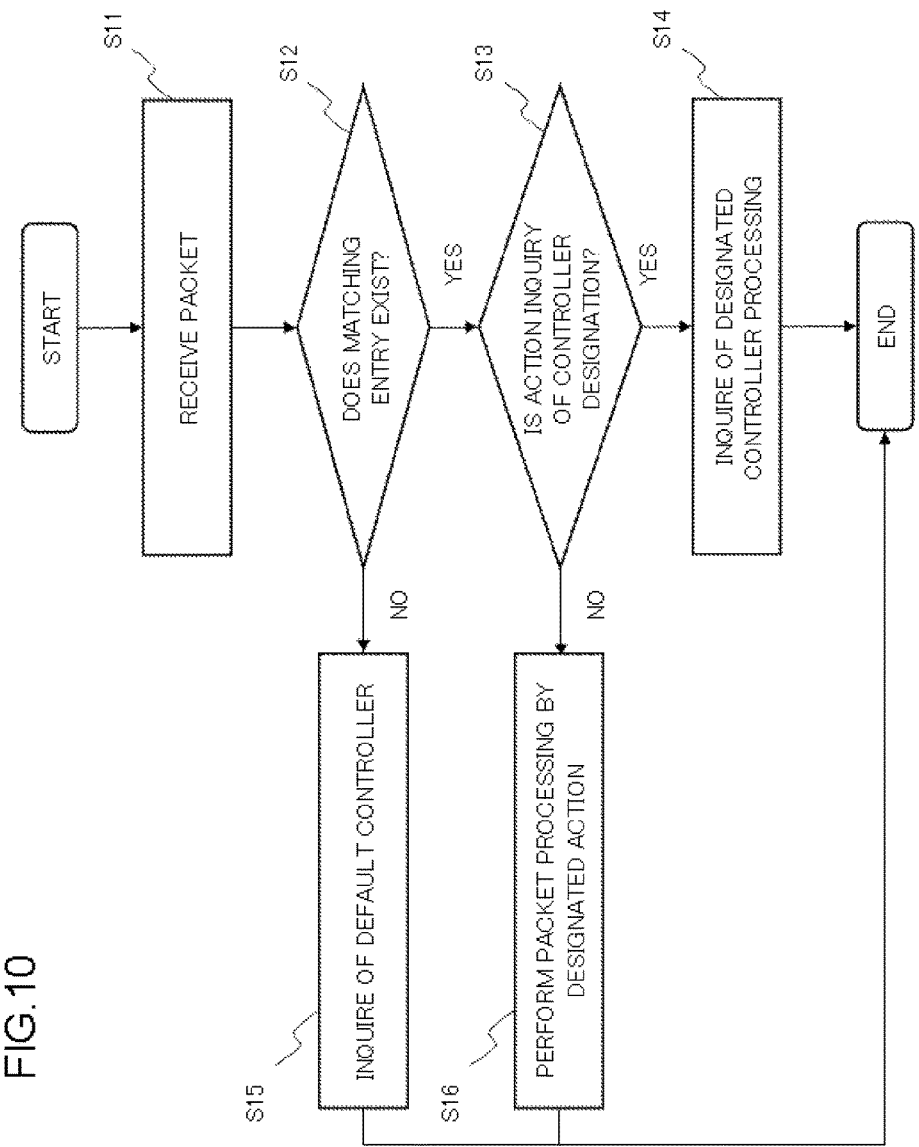
FIG. 10 is a flow chart illustrating an operation example of a second exemplary embodiment.

FIG. 10 is the flowchart illustrating the operation which is performed when the switch 12 receives a packet in the second exemplary embodiment.

The data processing means 124 receives a packet from different communication device in a network which is not shown (S11). Next, the flow identification means 123 determines whether or not the received packet matches the matching rule of the entry of the flow table 125 (S12).

If the entry of the flow table 125 which matches the received packet exists, the flow identification means 123 determines whether or not the action of the matched entry is an inquiry as to processing designating a controller (S13).

If it is determined the action of the matched entry is the inquiry as to the processing designating the controller, the controller designation processing inquiry means 1211 performs the inquiry as to processing to the designated controller (S14).

If it is determined the action of the matched entry is not the inquiry as to the processing designating the controller, the data processing means 124 performs packet processing according to the action of the matched entry (step S16). The data processing means 124, for example, transfers the received packet to other communication device, or abandons the received packet.

If it is determined that the packet does not match the matching rule of the entry of the flow table in S12, the control communication means 121 inquires of the controller which is set as default about the processing (S15).

Figure 11:
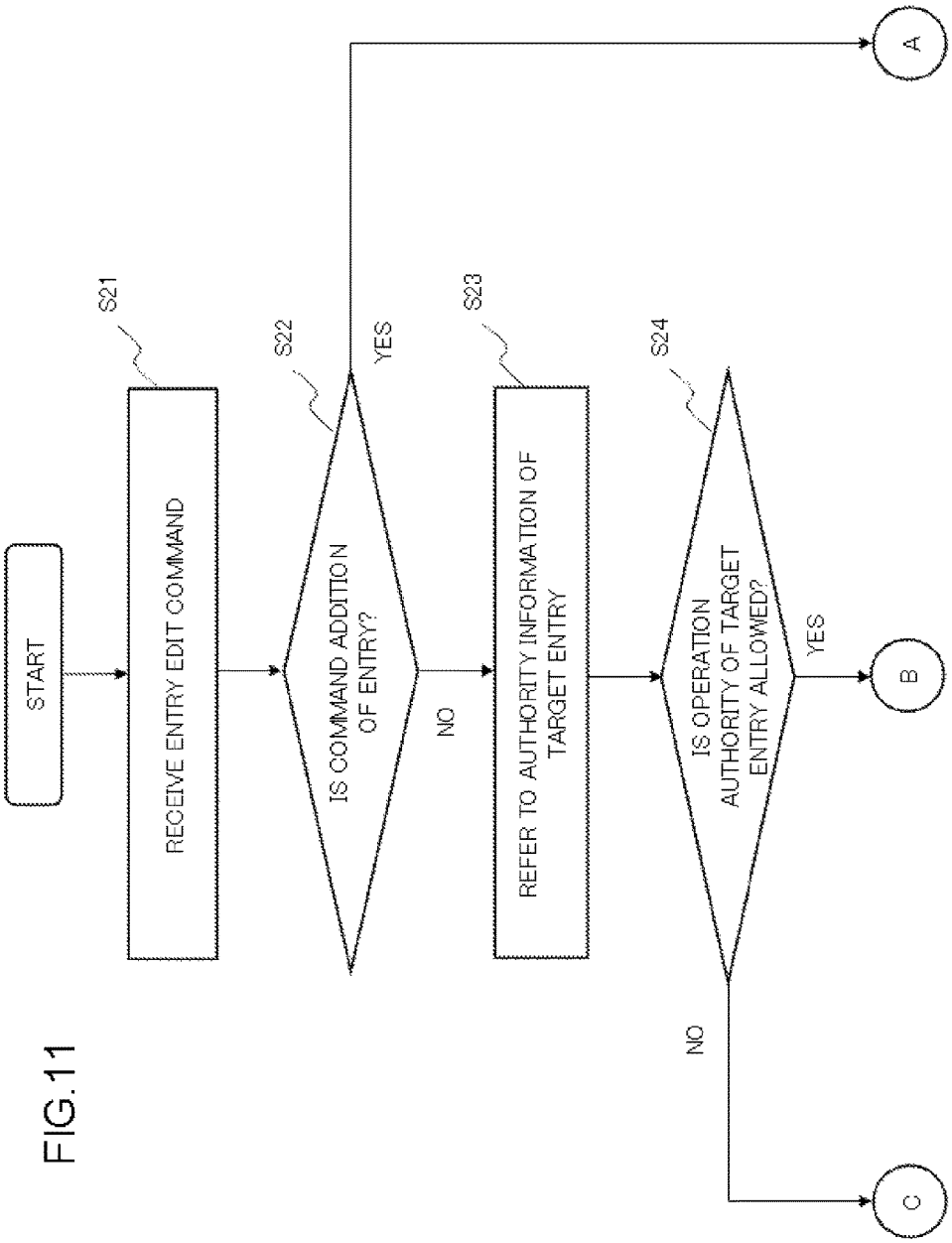
FIG. 11 is a flow chart illustrating an operation example of a second exemplary embodiment.
Figure 12:
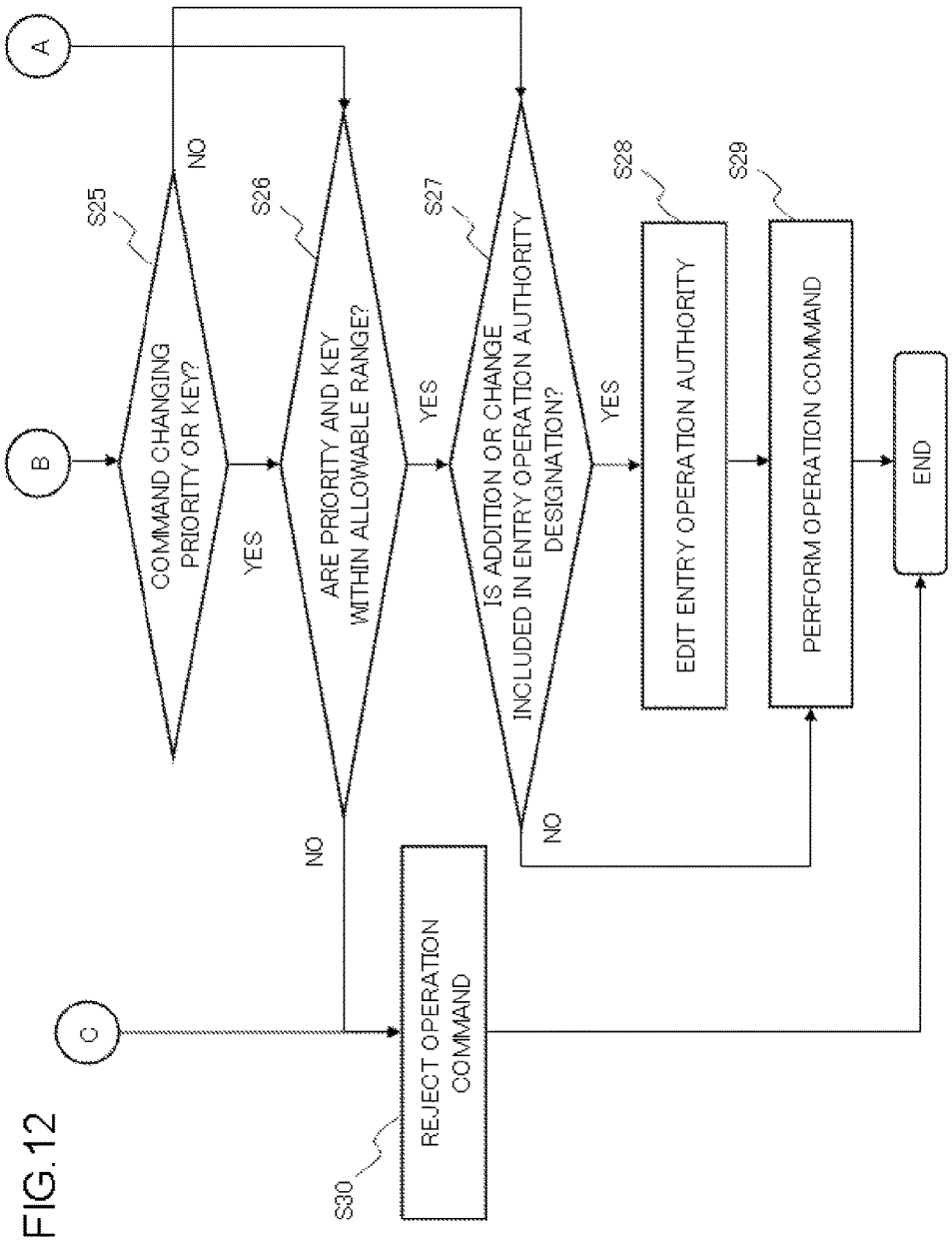
FIG. 12 is a flow chart illustrating an operation example of a second exemplary embodiment.

FIG. 11 and FIG. 12 are flowcharts illustrating operations which are performed when the switch 12 receives the entry edit command from the controller 11.

Initially, the control communication means 121 receives the entry edit command from the controller 11 (S21).

Next, the flow table management means 122 determines whether or not the received command is the command for adding the entry to the flow table 125 (S22).

If it is determined that the received command is not the command for adding the entry to the flow table in S22, an operation of S23 is performed. The entry operation authority management/determination means 12211 refers to the authority information stored in the entry addition information storage means 1222 (S23). After that, the entry operation authority management/determination means 12211 determines whether or not the controller which sends the command is allowed to perform a request operation for the entry which is the edit target (S24).

If it is determined that the entry edit command is the command for adding the entry to the flow table in S22, processing of S26 is performed. The processing of S26 is described below.

If it is determined that the request operation for the entry which is the edit target is allowed in S24, the authority management/determination means 1221 performs processing of S25. The authority management/determination means 1221 determines whether or not the entry edit command is the command which changes priority of the entry or the matching rule (S25).

If the controller which sends the entry edit command is not allowed to perform the request operation for the entry which is the edit target in S24, an operation command is rejected (step S30).

If it is determined that the entry edit command is the command which changes priority of the entry or the matching rule in S25, the flow range determination means 12212 performs processing of S26. The flow range determination means 12212 determines whether or not the priority of the entry or the matching rule after change which is requested by the entry edit command falls within the range which is allowable for the request source controller (S26).

If it is determined that the priority of the entry or the matching rule after change which is requested by the entry edit command falls within the range which is allowed for the controller in S26, the entry operation authority management/determination means 12211 performs processing of S27. The entry operation authority management/determination means 12211 determines whether or not new addition is included in entry operation authority designation, or whether or not change is included therein and whether neither new addition nor change is included (S27).

If it is determined that new addition or change is included in entry operation authority designation in S27, the entry operation authority management/determination means 12211 performs processing of S28. In the entry operation authority management/determination means 12211, the entry operation authority of the entry addition information storage means 1222 is edited (step S28). After that, the flow table operation means 1223 performs the operation command (step S29). If it is determined that neither new addition nor change is included in entry operation authority designation in S27, processing of S28 is skipped and processing of S29 is performed.

Figure 13:
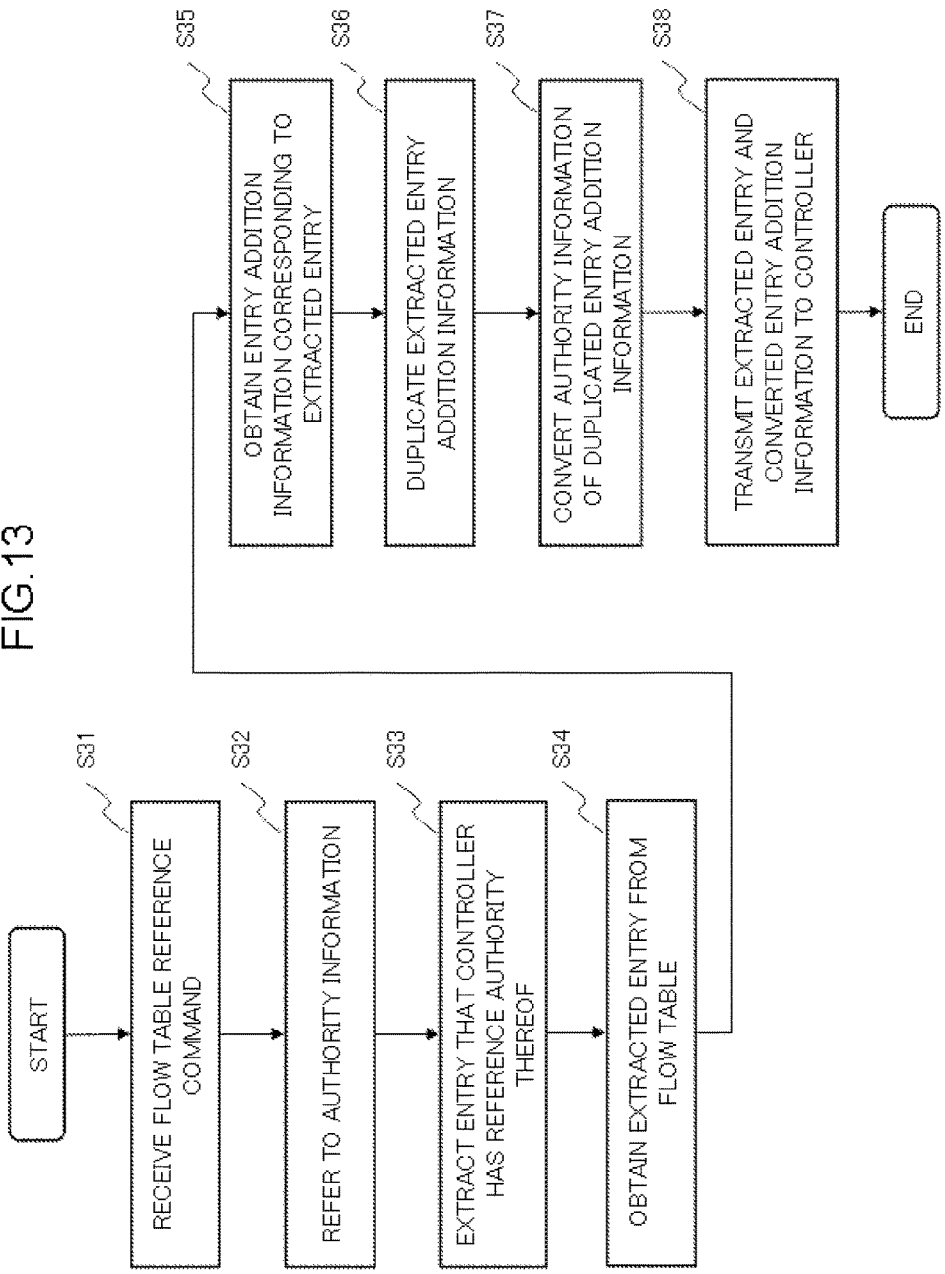
FIG. 13 is a flow chart illustrating an operation example of a second exemplary embodiment.

The controller 11 may transmit a command for referring to the flow table to the switch 12 in order to manage the switch 12. Hereinafter, the command is called a flow table reference command. FIG. 13 is a flowchart illustrating an operation which is performed when the switch 12 receives the flow table reference command from the controller 11.

First, the switch 12 receives the flow table reference command from the controller 11 through the control communication means 121 (S31).

Next, the entry operation authority management/determination means 12211 refers to the authority information stored in the entry addition information storage means 1222 (S32).

After S32, the entry operation authority management/determination means 12211 extracts the entry, whose reference authority is owned by the controller which is the command transmission source (S33).

The flow table operation means 1223 obtains, from the flow table 125, the entry extracted in S33 (S34).

In the entry operation authority management/determination means 12211, the entry addition information corresponding to the entry extracted in step S32 is obtained from the entry addition information storage means 1222 (S35).

Next, the entry operation authority management/determination means 12211 duplicates the entry addition information obtained in S35 (S36).

In addition, the entry operation authority management/determination means 12211 converts the authority information in the entry addition information duplicated in S36 into authority which the controller requesting reference has (S37).

Finally, the control communication means 121 transmits the entry obtained in S34 and the entry addition information converted in S37 to the controller 11 requesting reference (S38).

[Advantageous Effects]

As described above, the communication system of the second exemplary embodiment uses the action designating any one of the controllers 11 as the action for the entry of the flow table 125. Thereby, it becomes possible to separate the controllers of which the processing of the packet is inquired, for each flow range. As a result, for example, the control, in which one controller is determined for a specific flow, is possible.

The switch 12 holds the authority information of the controller 11 for each entry and restricts the operation for the entry of the flow table 125. Thereby the flow range which the controller 11 can control is restricted. Therefore, it is possible to prevent a different controller from unintentionally overwriting a control policy.

On the basis of the above operations, it becomes possible to directly control the switch 12 by a plurality of controllers 11 while determining a control range and an authority range. Consequently, according to the second exemplary embodiment, even though a plurality of controllers 11 to control the switch 12 are arranged, one controller 11 to control the received packet can be determined. It is therefore possible to control the switch 12 by the plurality of controllers 11.

Third Exemplary Embodiment

Configuration

A third exemplary embodiment of the invention is described below. In the third exemplary embodiment, the flow table management means 122 of the switch 12 and a flow table 225 are different from those of the second exemplary embodiment. Items which are different from the flow table management means 122 are focused and described below. Descriptions of the configuration and the operation similar to those of the second exemplary embodiment are omitted.

Figure 14:
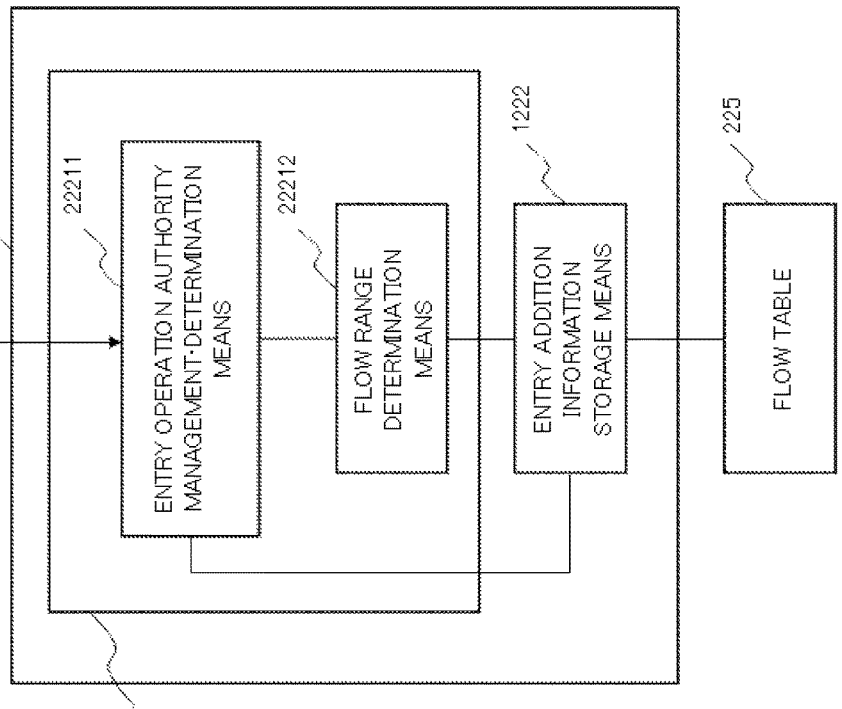
FIG. 14 is a diagram illustrating a configuration example of a switch of a third exemplary embodiment.

FIG. 14 is a block diagram illustrating flow table management means 222 of the third exemplary embodiment. In FIG. 14, the flow table management means 222 includes authority management/determination means 2221 and the flow table operation means 1223. The authority management/determination means 2221 includes entry operation authority management/determination means 22211 and flow range determination means 22212. The entry operation authority management/determination means 22211 connects with the control communication means 121, the flow range determination means 22212 and the flow table operation means 1223.

The entry addition information storage means 1222 is not included compared with the flow table management means 122 of the second exemplary embodiment. In the third exemplary embodiment, the flow table 225 stores information which the entry addition information storage means 1222 of the second exemplary embodiment stores. FIG. 15 illustrates an example of the flow table 225 of the third exemplary embodiment. In FIG. 15, the flow table 225 stores the authority information in addition to the information which the flow table 125 of the second exemplary embodiment stores.

[Operation]

In the switch 12 of the third exemplary embodiment, when it is necessary to refer to or edit the entry addition information in the operation which is performed when the entry edit command is received from the controller 11, the flow table 225 is referred to or edited.

Figure 16:
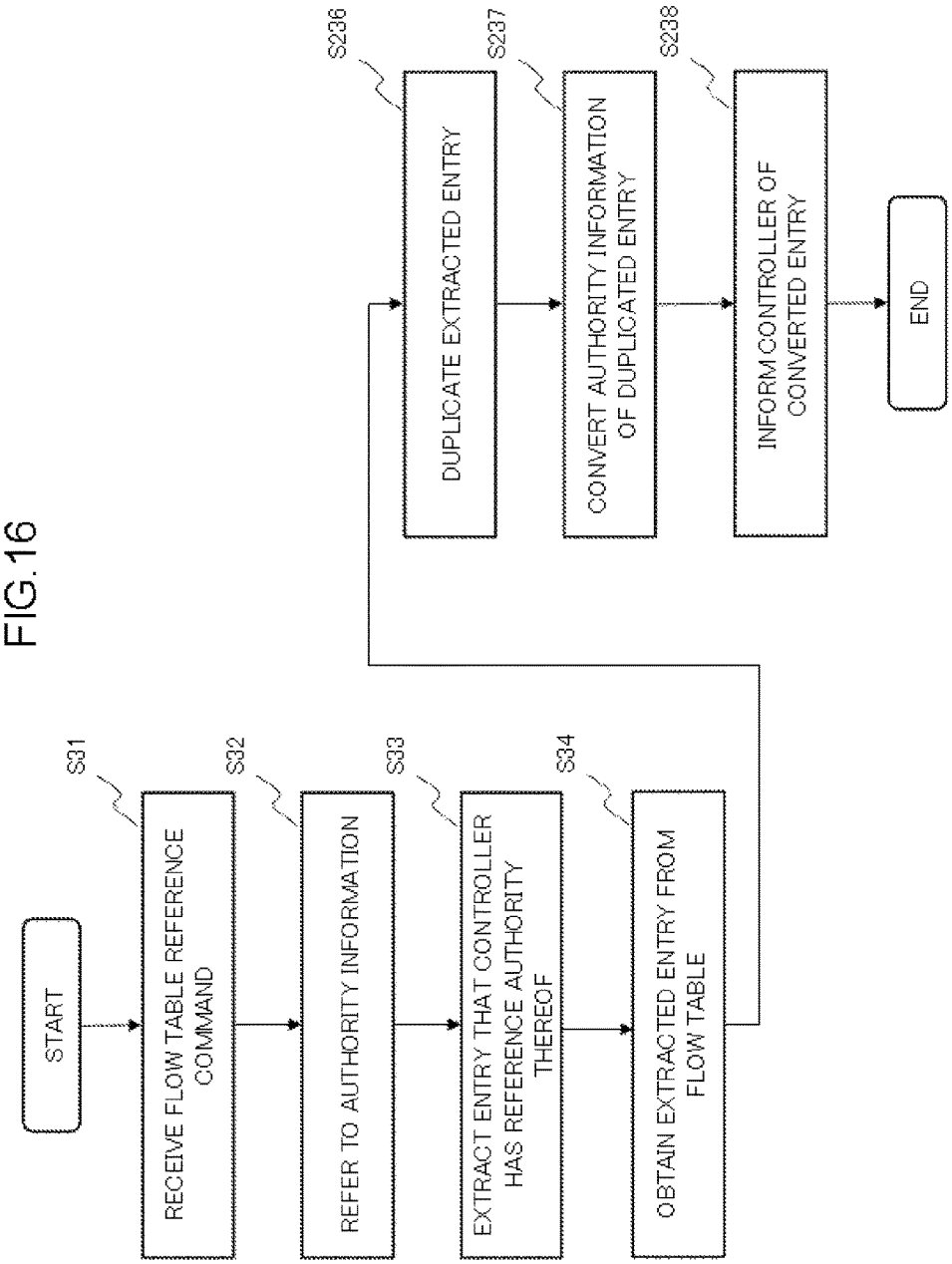
FIG. 16 is a flow chart illustrating an operation example of a third exemplary embodiment.

FIG. 16 is a flowchart illustrating operations which are performed when the switch 12 of the third exemplary embodiment receives the flow table reference command. The operation illustrated in FIG. 16 differs in the operations at and after S34 from the operation of the second exemplary embodiment. The other operations similar to those of the second exemplary embodiment have the same reference numerals as those of FIG. 13, and detailed descriptions thereon are omitted.

The entry operation authority management/determination means 22211 duplicates the entry obtained in S33 and S34 (S236).

Next, the entry operation authority management/determination means 22211 converts the authority information, which the entry duplicated in S236 includes, into the authority which the controller requesting the reference includes (S237).

Finally, the control communication means 121 informs the controller 11 requesting the reference, of the entry converted in S237 (S238).

[Advantageous Effects]

The communication system 1 of the third exemplary embodiment has the same effect as the second exemplary embodiment. That is, the action designating any one of the controllers 11 is used as the action for the entry of the flow table 225 of the third exemplary embodiment. Thereby, it becomes possible to separate the controllers of which the processing of the packet is inquired, for each flow range. As a result, for example, the control, in which one controller which controls for a specific flow is determined, is possible.

The switch 12 holds the authority information of the controller 11 for each entry and restricts the operation for the entry of the flow table 225. Thereby the flow range which the controller 11 can control is restricted. Therefore, it is possible to prevent a different controller from unintentionally overwriting the control policy.

On the basis of the above operations, it becomes possible to directly control the switch 12 by a plurality of controllers 11 while determining a control range and an authority range. Consequently, according to the third exemplary embodiment, even though a plurality of controllers 11 to control the switch 12 exist, one controller 11 to control the received packet can be determined. It is, therefore, possible to control the switch 12 by the plurality of controllers 11.

Fourth Exemplary Embodiment

Configuration

Figure 17:
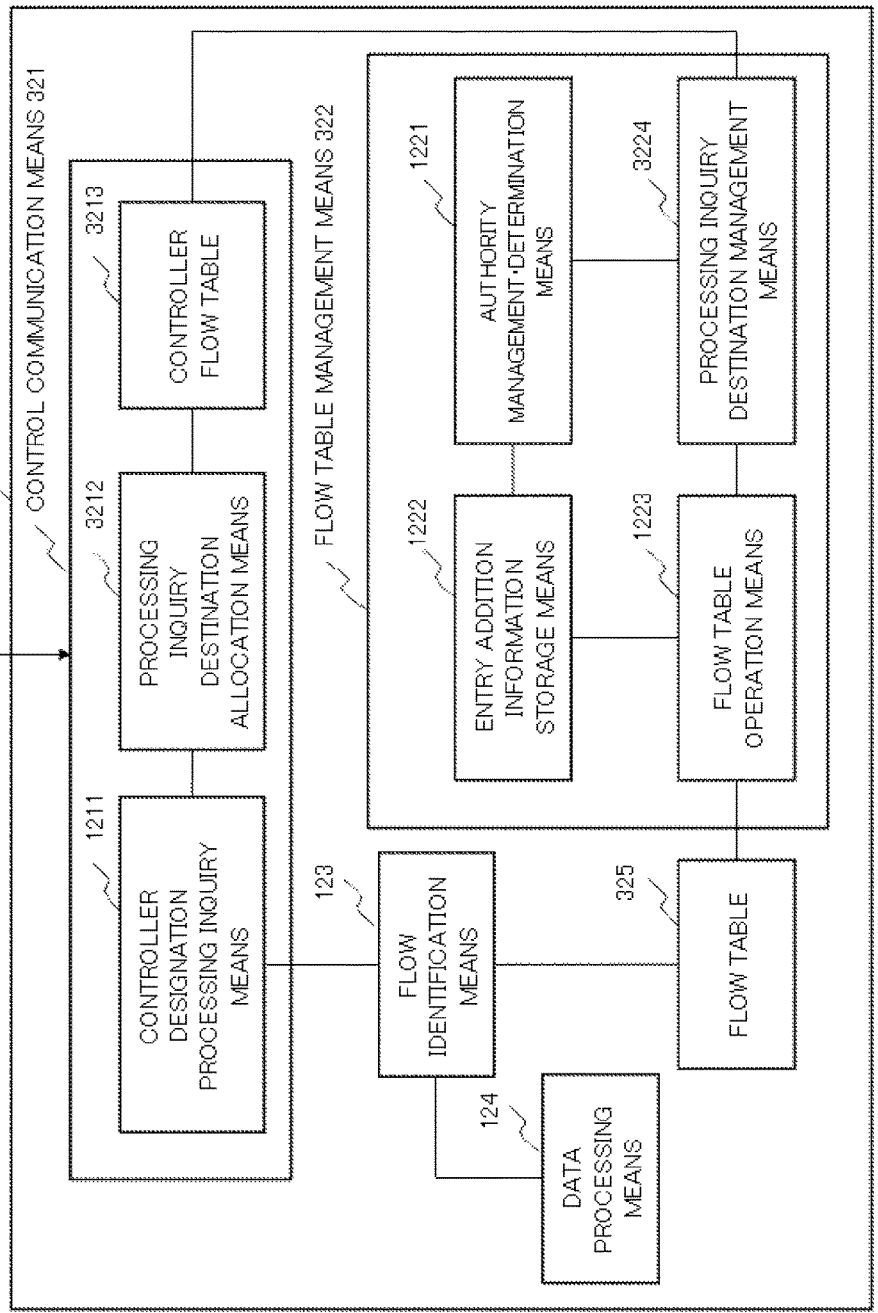
FIG. 17 is a diagram illustrating a configuration example of a switch of a fourth exemplary embodiment.

FIG. 17 illustrates a switch 32 of a fourth exemplary embodiment of the invention. As shown in FIG. 17, the switch 32 of the fourth exemplary embodiment differs from that of the second exemplary embodiment in control communication means 321, flow table management means 322 and a flow table 325. The other elements are similar to those of the second and third exemplary embodiments. The other elements similar to those of the second exemplary embodiment have the same reference numerals as FIGS. 4, 5, and 8, and detailed descriptions thereon are omitted.

In the fourth exemplary embodiment, an inquiry as to processing designating the controller may not be registered in the flow table 325 as the action. The case, in which that an inquiry as to processing designating the controller is not registered in the action of the flow table 325, is described below.

In the fourth exemplary embodiment, the control communication means 321 includes the controller designation processing inquiry means 1211, processing inquiry destination allocation means 3212, and a controller flow table 3213. In the fourth exemplary embodiment, processing inquiry destination management means 3224 is added to the flow table management means 322 of the second exemplary embodiment.

The newly added elements in the fourth exemplary embodiment are described. First, the processing inquiry destination allocation means 3212 chooses a controller to be inquired, in response to the inquiry to the controller 11 as to contents of processing of the packet. The processing inquiry destination allocation means 3212 converts a processing inquiry instruction without designating the controller into a processing inquiry instruction designating the controller.

FIG. 18 illustrates an example of the controller flow table 3213. In FIG. 18, the controller flow table 3213 includes, as the entry, at least the priority, the matching rule and an identifier of the destination controller. The identifier of the controller may be any one which is uniquely decided for the controller.

The processing inquiry destination management means 3224 manages an allocation standard of a processing inquiry destination, and converts an action part of the entry.

[Operation]

Figure 19:
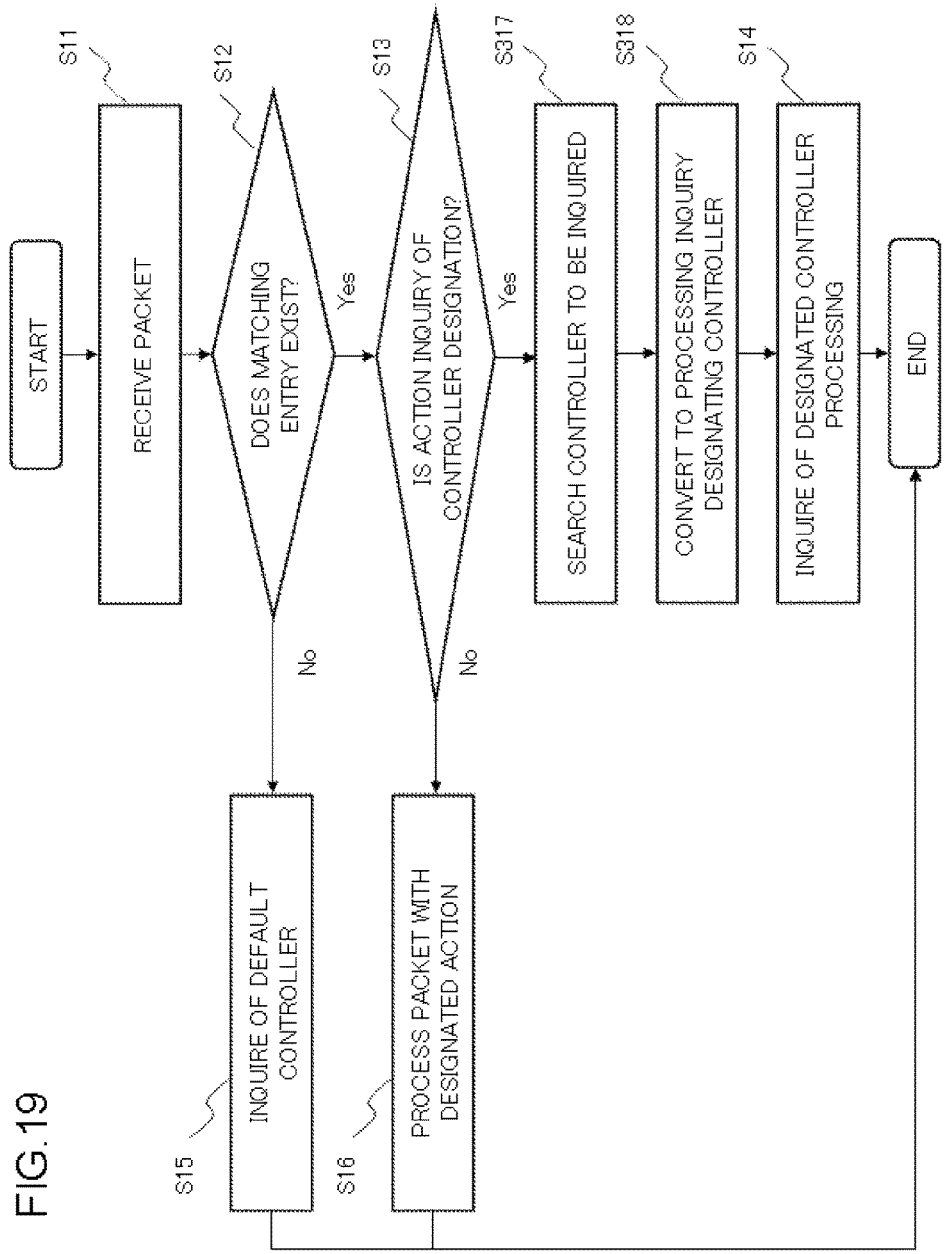
FIG. 19 is a flow chart illustrating an operation example of a fourth exemplary embodiment.
Figure 20:
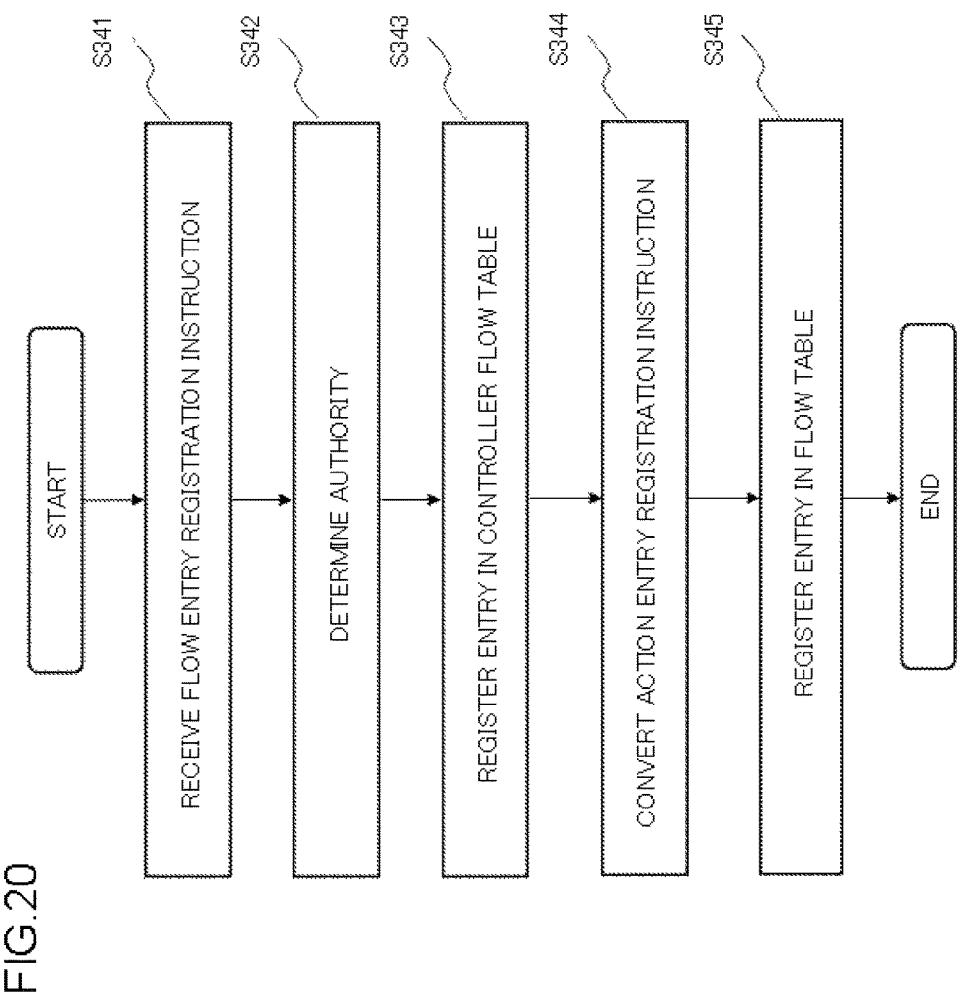
FIG. 20 is a flow chart illustrating an operation example of a fourth exemplary embodiment.

FIG. 19 and FIG. 20 are flowcharts illustrating operations of the switch 32 of the fourth exemplary embodiment of the invention. The operations similar to that of the second exemplary embodiment have the same reference numerals as FIG. 10 and descriptions thereof are omitted.

FIG. 19 is the flowchart illustrating operations which are performed when the switch 32 receives a packet. First, the switch 32 receives a packet and determines whether or not the packet matches the matching rule of the entry in the flow table (S11, S12).

In S12, if it is determined that the received packet matches the matching rule of the entry in the flow table, the flow identification means 123 determines whether or not the action of the entry in the matched matching rule is an inquiry as to processing to a controller (S13).

In S13, if it is determined that the action of the matched entry is the inquiry as to processing to the controller, the processing of S317 is performed. The processing inquiry destination allocation means 3212 searches the controller of which processing of the received packet is inquired, with reference to the controller flow table 3213 (S317). Specifically, the processing inquiry destination allocation means 3212 searches the entry having the matching rule of the controller flow table 3213 corresponding to the matching rule which the received packet matches. The processing inquiry destination allocation means 3212 obtains the destination controller of the searched entry as the inquiry destination.

Next, the processing inquiry destination allocation means 3212 converts a processing inquiry to the controller without designating a destination into a processing inquiry addressed to the searched controller (S318).

After that, the controller designation processing inquiry means 1211 inquires of the designated controller about the processing (S14).

FIG. 20 is a flowchart illustrating operations which are performed when the controller 11 instructs the switch 32 to register the entry designating the processing inquiry destination. In the second and the third exemplary embodiments, if the instruction to register the entry is received, it is directly registered in the flow table. In the fourth exemplary embodiment, the registration in the controller flow table 3213 is further required.

The control communication means 321 receives the instruction to register the entry designating the processing inquiry destination, from the controller 11 (S341).

Next, the authority management/determination means 1221 performs authority determination of the entry, like the second exemplary embodiment (S342).

Next, the processing inquiry destination management means 3224 registers the entry which takes the matching rule as key and takes the identifier of the controller as value on controller flow table 3213, and gives priority to the entry (S343).

The processing inquiry destination management means 3224 replaces the action for instructing the entry registration into the processing inquiry without designating a controller (S344).

Finally, the flow table operation means 1223 registers the entry in the flow table 325 (S345).

[Advantageous Effects]

The communication system 1 in the fourth exemplary embodiment includes the same effect as the communication system 1 of the second and the third exemplary embodiment. That is, with respect to the action of the processing inquiry to the controller in the entry of the flow table 325 of the fourth exemplary embodiment, the switch 32 stores the controller to be the inquiry destination, in the controller flow table 3213. Thereby the controllers of which the packet processing is inquired can be separated for each flow range. As a result, for example, the control, in which one controller which controls for a specific flow is determined, is possible.

The switch 32 holds the authority information of the controller 11 for each entry, and restricts operations with respect to the entry in the flow table 325. Thereby, the controller 11 restricts the controllable flow range. Therefore, it is possible to prevent a different controller from unintentionally overwriting the control policy.

On the basis of the above operations, it becomes possible to directly control the switch 32 by a plurality of controllers 11 while determining the control range and the authority range. Consequently, according to the third exemplary embodiment, even though a plurality of controllers 11 to control the switch 32 are arranged, one controller 11 to control the received packet can be determined. It is therefore possible to control the switch 32 by the plurality of controllers 11.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The switch of each exemplary embodiment is optionally applicable to a communication terminal, other communication apparatus, and the like, and not limited to the switch.

In the exemplary embodiments, the network to which the OpenFlow is applied is explained, but the present embodiment is not limited thereto. The present embodiment is applicable to the network in which a control server centrally controls the switch, other than the OpenFlow.

The functions of the switches of the exemplary embodiments, the communication terminal having the same function as the switch, and other communication apparatus can be achieved by hardware. The switch of the exemplary embodiment, the communication terminal having the same function as the switch, and other communication apparatus can be achieved using a computer and a program causing the computer to execute. The program is provided by being stored in a recording medium, like a magnetic disc, semiconductor memory, and the like, and is read by the computer at the time of booting the computer. The program controls the computer operations, and works the computer as the switch of the exemplary embodiments, the communication terminal and the communication apparatus which have the same function as the switch and causes them to execute processing described above.

The whole or part of the exemplary embodiments disclosed above can be described as, but not limited to, the following supplementary notes.

[Supplementary Note 1]

A communication terminal controlled by a control device, comprising:

a first storage means for associating information identifying a packet with processing of the packet and storing it as an entry;

a searching means for searching processing corresponding to a received packet from the first storage means; and an inquiry means for determining the control device of which is inquired, based on the entry corresponding to the received packet, the entry being stored in the first storage means, if the searched processing is the inquiry to the control device, and for performing the inquiry addressed to the determined control device.

[Supplementary Note 2]

The communication terminal of Supplementary note 1, wherein the processing of the packet stored in the first storage means includes performing the inquiry as to the processing of the packet by designating any one of the control devices.

[Supplementary Note 3]

The communication terminal of Supplementary note 1, further comprising a second storage means for storing the control device corresponding to the entry stored in the first storage means, wherein when determining the control device of which is inquired, the inquiry means refers to the second storage means.

[Supplementary Note 4]

The communication terminal of any one of Supplementary note 1 to Supplementary note 3, further comprising a third storage means for storing authority for the entry.

[Supplementary Note 5]

The communication terminal of any one of Supplementary note 1 to Supplementary note 3, wherein the first storage means associates the authority for the entry with the entry and stores.

[Supplementary Note 6]

The communication terminal of Supplementary note 4 or Supplementary note 5, further comprising an authority determination means for determining whether or not to edit the entry by the control device with reference to the authority for the entry when a request for edit of the entry is received from the control device.

[Supplementary Note 7]

The communication terminal of Supplementary note 6, wherein the authority determination means determines whether or not to edit the entry by the control device on the basis of at least one of priority of the entry and the information identifying a packet.

[Supplementary Note 8]

The communication terminal of Supplementary note 6 or Supplementary note 7, wherein the authority determination means determines whether or not to refer to the entry by the control device with reference to the authority for the entry when a request for referring to the entry is received from the control device.

[Supplementary Note 9]

A communication method, comprising the steps of:

searching processing corresponding to a received packet from a first storage means for associating information identifying a packet with processing of the packet and storing it as an entry;

determining the control device of which is inquired, based on the entry corresponding to the received packet, the entry being stored in the first storage means, if the searched processing is the inquiry to the control device controlling a communication terminal; and performing the inquiry addressed to the determined control device.

[Supplementary Note 10]

The communication method of Supplementary note 9, wherein the processing of the packet stored in the first storage means includes performing the inquiry as to the processing of the packet by designating any one of the control devices.

[Supplementary Note 11]

The communication method of Supplementary note 9, wherein a second storage means for storing the control device corresponding to the entry stored in the first storage means is referred to, when the control device of which is inquired is determined.

[Supplementary Note 12]

The communication method of any one of Supplementary note 9 to Supplementary note 11, wherein authority for the entry is stored.

[Supplementary Note 13]

The communication method of any one of Supplementary note 9 to Supplementary note 11, wherein the first storage means associates the authority for the entry with the entry and stores it.

[Supplementary Note 14]

The communication method of Supplementary note 12 or Supplementary note 13, further comprising determining whether or not to edit the entry by the control device with reference to the authority for the entry when a request for edit of the entry is received from the control device.

[Supplementary Note 15]

The communication method of Supplementary note 14, wherein it is determined whether or not to edit the entry by the control device on the basis of at least one of priority of the entry and the information identifying a packet.

[Supplementary Note 16]

The communication method of Supplementary note 14 or Supplementary note 15, further comprising determining whether or not to refer to the entry by the control device with reference to the authority for the entry when a request for referring to the entry is received from the control device.

[Supplementary Note 17]

A program for causing a computer to execute processes comprising:

searching processing corresponding to a received packet from a first storage means for associating information identifying a packet with processing of the packet and storing it as an entry;

determining the control device of which is inquired, based on the entry corresponding to the received packet, the entry being stored in the first storage means, if the searched processing is the processing to be inquired of the control device controlling a communication terminal; and performing the inquiry addressed to the determined control device.

[Supplementary Note 18]

The program of Supplementary note 17, wherein the processing of the packet stored in the first storage means includes performing the inquiry as to the processing of the packet by designating any one of the control devices.

[Supplementary Note 19]

The program of Supplementary note 18, wherein a second storage means for storing the control device corresponding to the entry stored in the first storage means is referred to, when the control device to be inquired is determined.

[Supplementary Note 20]

The program of any one of Supplementary note 17 to Supplementary note 19, wherein authority for the entry is stored.

[Supplementary Note 21]

The program of any one of Supplementary note 17 to Supplementary note 19, wherein the first storage means associates the authority for the entry with the entry and stores it.

[Supplementary Note 22]

The program of Supplementary note 20 or Supplementary note 21, the processes further comprising determining whether or not to edit the entry by the control device with reference to the authority for the entry when a request for edit of the entry is received from the control device.

[Supplementary Note 23]

The program of Supplementary note 22, wherein it is determined whether or not to edit the entry by the control device on the basis of at least one of priority of the entry and the information identifying a packet.

[Supplementary Note 24]

The program of Supplementary note 22 or Supplementary note 23, the processes further comprising determining whether or not to refer to the entry by the control device with reference to the authority for the entry when a request for referring to the entry is received from the control device.

[Supplementary Note 25]

A switch controlled by a control device, comprising a first storage means for associating information identifying a packet with processing of the packet and storing it as an entry;

a searching means for searching processing corresponding to a received packet from the first storage means; and an inquiry means for determining the control device to be inquired, based on the entry corresponding to the received packet, the entry being stored in the first storage means, if the searched processing is the inquiry to the control device, and for performing the inquiry addressed to the determined control device.

[Supplementary Note 26]

The switch of Supplementary note 25, wherein the processing of the packet stored in the first storage means includes performing the inquiry as to the processing of the packet by designating any one of the control devices.

[Supplementary Note 27]

The switch of Supplementary note 25, further comprising a second storage means for storing the control device corresponding to the entry stored in the first storage means, wherein when determining the control device of which is inquired, the inquiry means refers to the second storage means.

[Supplementary Note 28]

The switch of any one of Supplementary note 25 to Supplementary note 27, further comprising a third storage means for storing authority for the entry.

[Supplementary Note 29]

The switch of any one of Supplementary note 25 to Supplementary note 28, wherein the first storage means associates the authority for the entry with the entry and stores it.

[Supplementary Note 30]

The switch of Supplementary note 28 or Supplementary note 29, further comprising an authority determination means for determining whether or not to edit the entry by the control device with reference to the authority for the entry when a request for edit of the entry is received from the control device.

[Supplementary Note 31]

The switch of Supplementary note 30, wherein the authority determination means determines whether or not to edit the entry by the control device on the basis of at least one of priority of the entry and the information identifying a packet.

[Supplementary Note 32]

The switch of Supplementary note 30 or Supplementary note 31, wherein the authority determination means further determines whether or not to refer to the entry by the control device with reference to the authority for the entry when a request for referring to the entry is received from the control device.

[Supplementary Note 33]

A communication system, comprising:

a control device; and a communication terminal controlled by the control device, wherein the communication terminal comprises:

a first storage means for associating information identifying a packet with processing of the packet and storing as an entry;

a searching means for searching processing corresponding to a received packet from the first storage means; and an inquiry means for determining the control device of which is inquired, based on the entry corresponding to the received packet, the entry being stored in the first storage means, if the searched processing is the inquiry to the control device, and for performing the inquiry addressed to the determined control device.

[Supplementary Note 34]

The communication system of Supplementary note 33, wherein the processing of the packet stored in the first storage means includes performing the inquiry as to the processing of the packet by designating any one of the control device.

[Supplementary Note 35]

The communication system of Supplementary note 33, wherein the communication terminal further comprises a second storage means for storing the control device corresponding to the entry stored in the first storage means, wherein the inquiry means refers to the second storage means when the control device of which is inquired is determined.

[Supplementary Note 36]

The communication system of any one of Supplementary note 33 to Supplementary note 35, wherein the communication terminal further comprises a third storage means for storing authority for the entry.

[Supplementary Note 37]

The communication system of any one of Supplementary note 33 to Supplementary note 36, wherein the first storage means associates the authority for the entry with the entry and stores.

[Supplementary Note 38]

The communication system of Supplementary note 36 or Supplementary note 37, wherein the communication terminal further comprises an authority determination means for determining whether or not to edit the entry by the control device with reference to the authority for the entry when a request for referring to the entry is received from the control device.

[Supplementary Note 39]

The communication system of Supplementary note 38, wherein the authority determination means determines whether or not to edit the entry by the control device on the basis of at least one of priority of the entry and the information identifying a packet.

[Supplementary Note 40]

The communication system of Supplementary note 38 or Supplementary note 39, wherein the authority determination means further determines whether or not to refer to the entry by the control device with reference to the authority for the entry when a request for referring to the entry is received from the control device.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2011-207659, filed on Sep. 22, 2011, the disclosure of which is incorporated herein in its entirety by reference.

REFERENCE SIGNS LIST

1 Communication System
11 Controller
12, 32 Switch
121, 321 Control Communication Means
122, 222, 322 Flow Table Management Means
123 Flow Identification Means
124 Data Processing Means
125, 225, 325 Flow Table
1211 Controller Designation Processing Inquiry Means
1221, 2221 Authority Management/Determination Means
1222 Entry Addition Information Storage Means
1223 Flow Table Operation Means
3212 Processing Inquiry Destination Allocation Means
3213 Controller Flow Table
3224 Processing Inquiry Destination Management Means
12211, 22211 Entry Operation Authority Management/Determination Means
12212, 22212 Flow Range Determination Means

The invention claimed is:

1. A communication terminal, comprising:
a flow table storing a plurality of entries, each entry including a matching rule and an action corresponding to the matching rule, wherein the plurality of actions include control apparatus information representing a plurality of control apparatuses, wherein each of the plurality of control apparatuses is configured to send a packet processing instruction to the communication terminal; and at least one processor configured to execute instructions to:
receive a packet; and
responsive to determining that the packet matches a first matching rule in the flow table;
responsive to determining that an action corresponding to the first matching rule is an inquiry to a designated control apparatus of the plurality of control apparatuses, perform an inquiry about processing of the packet to the designated control apparatus; and
responsive to determining that the action corresponding to the first matching rule is not an inquiry to any of the plurality of control apparatuses, perform processing of the packet according to the action.

2. The communication terminal of claim 1, wherein at least one of the plurality of control apparatuses is an authorized control apparatus which is configured to store the control apparatus information.

3. The communication terminal of claim 2, wherein the control apparatus information includes authority information which represents the authorized control apparatus.

4. The communication terminal of claim 3, wherein the at least one processor is further configured to execute instructions to:
receive a request from the authorized control apparatus; and
modify the control apparatus information based on the authority information and the request.

5. The communication terminal of claim 4, wherein the control apparatus information represents a range of the control apparatus information within which the authorized control apparatus modifies the control apparatus information, and wherein the at least one processor is further configured to execute instructions to modify the control apparatus information based on the range.

6. The communication terminal of claim 3, wherein the at least one processor is further configured to execute instructions to:
receive a request from the authorized control apparatus; and
send the control apparatus information to the authorized control apparatus based on the authority information.

7. The communication terminal of claim 3, wherein the flow table further stores authority to operate an entry, wherein the authority is associated with the entry, and wherein the at least one processor is further configured to execute an instruction to determine whether or not to edit the entry by the control apparatus with reference to the authority for the entry when a request for edit of the entry is received from the control apparatus.

8. The communication terminal of claim 7, wherein the at least one processor is further configured to execute an instruction to determine whether or not to edit the entry by the control apparatus on the basis of at least one of priority of the entry and the information identifying a packet.

9. The communication terminal of claim 8, wherein the at least one processor is further configured to execute an instruction to determine whether or not to reference the entry by the control apparatus with reference to the authority for the entry when a request for referencing the entry is received from the control apparatus.

10. The communication terminal of claim 1, wherein the processor is further configured to execute an instruction to, responsive to determining that the packet does not match any matching rule of the flow table, perform an inquiry about processing of the packet to a default control apparatus.

11. A communication method of a communication terminal, comprising:
storing, in a flow table, a plurality of entries, each entry including a matching rule and an action corresponding to the matching rule, wherein the plurality of actions include control apparatus information representing a plurality of control apparatuses, wherein each of the plurality of control apparatuses is configured to send a packet processing instruction to the communication terminal;
receiving a packet; and
responsive to determining that the packet matches a first matching rule in the flow table;
responsive to determining that an action corresponding to the first matching rule is an inquiry to a designated control apparatus of the plurality of control apparatuses, performing an inquiry about processing of the packet to the designated control apparatus; and
responsive to determining that the action corresponding to the first matching rule is not an inquiry to any of the plurality of control apparatuses, performing processing of the packet according to the action.

12. The communication method of claim 11, wherein at least one of the plurality of control apparatuses is an authorized control apparatus which is configured to store the control apparatus information.

13. The communication method of claim 12, wherein the control apparatus information includes authority information which represents the authorized control apparatus.

14. The communication method of claim 13, further comprising:
receiving a request from the authorized control apparatus; and
modifying the control apparatus information based on the authority information and the request.

15. The communication method of claim 14, wherein the control apparatus information represents a range of the control apparatus information within which the authorized control apparatus modifies the control apparatus information, and wherein the control apparatus information is modified based on the range.

16. The communication method of claim 13, further comprising:
receiving a request from the authorized control apparatus; and
sending the control apparatus information to the authorized control apparatus based on the authority information.

17. The communication method of claim 13, further comprising:
storing authority to operate an entry, wherein the authority is associated with the entry; and determining whether or not to edit the entry by the control apparatus with reference to the authority for the entry when a request for edit of the entry is received from the control apparatus.

18. The communication method of claim 17, wherein it is determined whether or not to edit the entry by the control apparatus on the basis of at least one of priority of the entry and the information identifying a packet.

19. The communication method of claim 18, further comprising determining whether or not to reference the entry by the control apparatus with reference to the authority for the entry when a request for referencing the entry is received from the control apparatus.

20. The communication method of claim 11, further comprising:
responsive to determining that the packet does not match any matching rule of the flow table, performing an inquiry about processing of the packet to a default control apparatus.

21. A non-transitory recording medium that stores a computer program comprising a set of instructions that, when executed by a processor, causes the computer program to:
receive a packet;
search a flow table to determine whether or not the packet matches a matching rule in the flow table, wherein the flow table stores a plurality of entries, each entry including a matching rule and an action corresponding to the matching rule, wherein the plurality of actions include control apparatus information representing a plurality of control apparatuses, wherein each of the plurality of control apparatuses is configured to send a packet processing instruction to a communication terminal; and
responsive to determining that the packet matches a first matching rule of the flow table;
responsive to determining that an action corresponding to the first matching rule is an inquiry to a designated control apparatus of the plurality of control apparatuses, perform an inquiry about processing of the packet to the designated control apparatus; and
responsive to determining that the action corresponding to the first matching rule is not an inquiry to any of the plurality of control apparatuses, perform processing of the packet according to the action.

22. The non-transitory recording medium of claim 21, wherein at least one of the plurality of control devices apparatuses is an authorized control apparatus which is configured to store the control apparatus information.

23. The non-transitory recording medium of claim 22, wherein the computer program further comprises an instruction to:
receive a request from the authorized control apparatus; and
modify the control apparatus information based on the authority information and the request.

24. The non-transitory recording medium of claim 23, wherein it is determined whether or not to edit the entry by the control apparatus on the basis of at least one of priority of the entry and the information identifying a packet.

25. The non-transitory recording medium of claim 23, wherein the computer program further comprises an instruction to:
receive a request from the authorized control apparatus; and
send the control apparatus information to the authorized control apparatus based on the authority information.

26. The non-transitory recording medium of claim 21, wherein the control apparatus information includes authority information which represents the authorized control apparatus.

27. The non-transitory recording medium of claim 26, wherein the computer program further comprises instructions to:
store authority to operate an entry, wherein the authority is associated with the entry; and
determine whether or not to edit the entry by the control apparatus with reference to the authority for the entry when a request for edit of the entry is received from the control apparatus.

28. The non-transitory recording medium of claim 27, wherein it is determined whether or not to edit the entry by the control apparatus on the basis of at least one of priority of the entry and the information identifying a packet.

29. The non-transitory recording medium of claim 28, wherein the computer program further comprises an instruction to: determine whether or not to reference the entry by the control apparatus with reference to the authority for the entry when a request for referencing the entry is received from the control apparatus.

30. The non-transitory recording medium of claim 21, further comprising:
responsive to determining that the packet does not match any matching rule of the flow table, performing an inquiry about processing of the packet to a default control apparatus.

31. A switch, comprising:
a flow table storing a plurality of entries, each entry including a matching rule and an action corresponding to the matching rule, wherein the plurality of actions include control apparatus information representing a plurality of control apparatuses, wherein each of the plurality of control apparatuses is configured to send a packet processing instruction to the switch; and
at least one processor configured to execute instructions to:
receive a packet; and
responsive to determining that the packet matches a first matching rule in the flow table;
responsive to determining that an action corresponding to the first matching rule is an inquiry to a designated control apparatus of the plurality of control apparatuses, perform an inquiry about processing of the packet to the designated control apparatus; and
responsive to determining that the action corresponding to the first matching rule is not an inquiry to any of the plurality of control apparatuses, perform processing of the packet according to the action.

32. The switch of claim 31, wherein at least one of the plurality of control apparatus is an authorized control apparatus which is configured to store the control apparatus information.

33. The switch of claim 32, wherein the at least one processor is further configured to execute instructions to:
receive a request from the authorized control apparatus; and
modify the control apparatus information based on the authority information and the request.

34. The switch of claim 33, wherein the control apparatus information represents a range of the control apparatus information within which the authorized control apparatus modifies the control apparatus information, and wherein the at least one processor is further configured to execute instructions to modify the control apparatus information based on the range.

35. The switch of claim 33, wherein the at least one processor is further configured to execute instructions to:
receive a request from the authorized control apparatus; and
send the control apparatus information to the authorized control apparatus based on the authority information.

36. The switch of claim 31, wherein the control apparatus information includes authority information which represents the authorized control apparatus.

37. The switch of claim 36, wherein the flow table further stores authority to operate an entry, wherein the authority is associated with the entry, and wherein the at least one processor is further configured to execute an instruction to determine whether or not to edit the entry by the control apparatus with reference to the authority for the entry when a request for edit of the entry is received from the control apparatus.

38. The switch of claim 37, wherein the at least one processor is further configured to execute an instruction to determine whether or not to edit the entry by the control apparatus on the basis of at least one of priority of the entry and the information identifying a packet.

39. The switch of claim 38, wherein the at least one processor is further configured to execute an instruction to determine whether or not to reference the entry by the control apparatus with reference to the authority for the entry when a request for referencing the entry is received from the control apparatus.

40. The switch of claim 31, wherein the processor is further configured to execute an instruction to, responsive to determining that the packet does not match any matching rule of the flow table, perform an inquiry about processing of the packet to a default control apparatus.

41. A communication system, comprising:
a plurality of control devices; and
a communication terminal, wherein
each of the plurality of control devices is configured to send a packet processing instruction to the communication terminal, and
the communication terminal comprises:
a flow table storing a plurality of entries, each entry including a matching rule and an action corresponding to the matching rule, wherein the plurality of actions include control device information representing a plurality of control devices; and
at least one processor configured to execute instructions to:
receive a packet; and
responsive to determining that the packet matches a first matching rule of the flow table;
responsive to determining that an action corresponding to the first matching rule is an inquiry to a designated control device of the plurality of control devices, perform an inquiry about processing of the packet to the designated control device; and
responsive to determining that the action corresponding to the first matching rule is not an inquiry to any of the plurality of control devices, perform processing of the packet according to the action.

42. The communication system of claim 41, wherein at least one of the plurality of control devices is an authorized control device which is configured to store the control device information.

43. The communication system of claim 42, wherein the at least one processor is further configured to execute instructions to:
receive a request from the authorized control device; and
modify the control device information based on the authority information and the request.

44. The communication system of claim 43, wherein the control device information represents a range of the control device information within which the authorized control device modifies the control device information, and wherein the at least one processor is further configured to execute instructions to modify the control device information based on the range.

45. The communication system of claim 43, wherein the at least one processor is further configured to execute instructions to:
receive a request from the authorized control device; and
send the control device information to the authorized control device based on the authority information.

46. The communication system of claim 41, wherein the control device information includes authority information which represents the authorized control device.

47. The communication system of claim 46, wherein the flow table further stores authority to operate an entry, wherein the authority is associated with the entry, and wherein the at least one processor is further configured to execute an instruction to determine whether or not to edit the entry by the control device with reference to the authority for the entry when a request for edit of the entry is received from the control device.

48. The communication system of claim 47, wherein the at least one processor is further configured to execute an instruction to determine whether or not to edit the entry by the control device on the basis of at least one of priority of the entry and the information identifying a packet.

49. The communication system of claim 48, wherein the at least one processor is further configured to execute an instruction to determine whether or not to reference the entry by the control device with reference to the authority for the entry when a request for referencing the entry is received from the control device.

* * * * *